United States Patent
Funabashi et al.

(10) Patent No.: US 9,337,763 B2
(45) Date of Patent: May 10, 2016

(54) POWER TOOL SYSTEM AND POWER SUPPLY DEVICE

(75) Inventors: Kazuhiko Funabashi, Hitachinaka (JP); Nobuhiro Takano, Hitachinaka (JP); Yoshikazu Kawano, Hitachinaka (JP); Yasushi Nakano, Hitachinaka (JP); Yuki Horie, Hitachinaka (JP); Shinji Watanabe, Hitachinaka (JP); Miyoji Onose, Hitachinaka (JP); Haruhisa Fujisawa, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 90 days.

(21) Appl. No.: 13/880,153

(22) PCT Filed: Oct. 26, 2011

(86) PCT No.: PCT/JP2011/005995
§ 371 (c)(1),
(2), (4) Date: Apr. 18, 2013

(87) PCT Pub. No.: WO2012/056700
PCT Pub. Date: May 3, 2012

(65) Prior Publication Data
US 2014/0015451 A1      Jan. 16, 2014

(30) Foreign Application Priority Data

Oct. 27, 2010  (JP) ................................ 2010-240804
Jan. 14, 2011  (JP) ................................ 2011-006443
Mar. 24, 2011  (JP) ................................ 2011-066571

(51) Int. Cl.
*H02P 1/00*        (2006.01)
*H02P 23/00*       (2016.01)
(Continued)

(52) U.S. Cl.
CPC ............ *H02P 23/0063* (2013.01); *H02P 1/028* (2013.01); *H02J 2007/004* (2013.01)

(58) Field of Classification Search
CPC ..... H02P 4/00; H02J 7/0024; H02K 11/0073; H02K 7/145
USPC .............. 318/254.1, 263, 264, 276, 277, 139, 318/599, 722, 434
See application file for complete search history.

(56) References Cited

U.S. PATENT DOCUMENTS 3,809,975 A       5/1974   Bartels
3,988,656 A  *   10/1976   Schnizler, Jr. et al. ........ 388/830
(Continued)

FOREIGN PATENT DOCUMENTS

CN          1374746 A       10/2002
CN          1967966 A        5/2007
(Continued)

OTHER PUBLICATIONS

International Report on Patentability for application PCT/JP2011/005995 (May 10, 2013).
(Continued)

*Primary Examiner* — Bentsu Ro
*Assistant Examiner* — Thai Dinh
(74) *Attorney, Agent, or Firm* — Kilpatrick Townsend & Stockton LLP

(57) ABSTRACT

A power tool system includes: a power tool including an AC motor; a portable battery pack; and a power supply device that converts a DC power supplied from the portable battery pack into an AC power to supply the AC power to the AC motor.

24 Claims, 17 Drawing Sheets

(51) Int. Cl.
*H02P 1/02* (2006.01)
*H02J 7/00* (2006.01)

(56) References Cited

U.S. PATENT DOCUMENTS

| | | | | |
|---|---|---|---|---|
| 4,489,261 | A * | 12/1984 | Hartwig et al. | 318/700 |
| 5,105,130 | A * | 4/1992 | Barker et al. | 318/268 |
| 5,625,539 | A * | 4/1997 | Nakata et al. | 363/17 |
| 7,088,066 | B2 * | 8/2006 | Haller | H02M 1/10 173/5 |
| 7,270,591 | B2 * | 9/2007 | Deshpande et al. | 451/5 |
| 7,298,101 | B2 * | 11/2007 | Watts | H02P 25/027 173/18 |
| 7,318,768 | B2 * | 1/2008 | Deshpande et al. | 451/5 |
| 7,371,150 | B2 * | 5/2008 | Deshpande | B24B 23/03 451/357 |
| 7,420,341 | B2 * | 9/2008 | Glasgow et al. | 318/280 |
| 7,646,155 | B2 * | 1/2010 | Woods | H02P 25/14 318/255 |
| 7,821,217 | B2 * | 10/2010 | Abolhassani et al. | 318/432 |
| 7,834,566 | B2 * | 11/2010 | Woods | H02P 25/14 318/255 |
| 8,067,913 | B2 | 11/2011 | Watabe et al. | |
| 2002/0134811 | A1 * | 9/2002 | Napier et al. | 227/131 |
| 2005/0023017 | A1 * | 2/2005 | Sakai | 173/201 |
| 2005/0127862 | A1 | 6/2005 | Glasgow et al. | |
| 2006/0255756 | A1 * | 11/2006 | Iwata et al. | 318/254 |
| 2007/0108941 | A1 | 5/2007 | Sainomoto et al. | |
| 2008/0304199 | A1 | 12/2008 | Cruise et al. | |
| 2009/0051306 | A1 * | 2/2009 | Matsunaga et al. | 318/434 |
| 2009/0096401 | A1 | 4/2009 | Watabe et al. | |

FOREIGN PATENT DOCUMENTS

| | | |
|---|---|---|
| CN | 101372095 A | 2/2009 |
| CN | 101391416 A | 3/2009 |
| EP | 2039479 A1 | 3/2009 |
| JP | 05-022837 A | 1/1993 |
| JP | 09-285184 A | 10/1997 |
| JP | 11-289102 A | 10/1999 |
| JP | 2000-333473 A | 11/2000 |
| JP | 2002-199791 A | 7/2002 |
| JP | 2004-343884 A | 12/2004 |
| JP | 2004-343972 A | 12/2004 |
| JP | 2008-148366 A | 6/2008 |
| JP | 2009-072878 A | 4/2009 |
| JP | 2009-219428 A | 10/2009 |
| JP | 2009-284735 A | 12/2009 |
| JP | 2010-170779 A | 8/2010 |

OTHER PUBLICATIONS

International Search Report for application PCT/JP2011/005995 (Feb. 18, 2013).
China Intellectual Property Office office action for patent application CN201180052226.0 (Jan. 6, 2015).
Japan Patent Office office action for patent application JP2011-006443 (Sep. 25, 2014).
Japan Patent Office office action for patent application JP2011-066571 (May 11, 2015).

* cited by examiner

FIG. 12

| CURRENT | | ALLOWBLE TIME |
|---|---|---|
| MORE THAN 10A | | 0.5s |
| 8~10A | | 1.0s |
| 6~8A | | 3.0s |
| 5~6A | | 5.0s |
| 4~5A | 100~120°C | 5.0s |
| | 80~100°C | 10.0s |
| | 60~80°C | 20.0s |

POWER TOOL SYSTEM AND POWER SUPPLY DEVICE

TECHNICAL FIELD

The present invention relates to a power tool system, and a power supply device provided in the power tool system.

BACKGROUND ART

Some conventional power tools disclosed in Japanese Patent Application Publication No. 2009-219428, such as lawn mowers, are driven by AC power supplied directly from an AC commercial power supply to the AC motor of the power tool.

DISCLOSURE OF INVENTION

Solution to Problem

However, lawn mowers driven by AC power have poor operability because they can only be operated within the range allowed by the accompanying power cord.

On the other hand, there are other lawn mowers known in the art that can be driven by DC power supplied from a battery pack. However, a large current flows in the battery pack when the motor provided in this type of lawn mower is started up. This large current can adversely affect the service life of the battery pack.

In view of the foregoing, it is an object of the present invention to provide a portable power tool system that can drive a power tool provided with an AC motor in areas where an AC power supply is unavailable. It is another object of the present invention to provide a power supply device for use in the power tool system.

In order to attain the above and other objects, the invention provides a power tool system including: a power tool including an AC motor; a portable battery pack; and a power supply device that converts a DC power supplied from the portable battery pack into an AC power to supply the AC power to the AC motor.

It is preferable that the power tool further includes a trigger switch. The power supply device includes: an inverter circuit that converts the DC power supplied from the portable battery pack into the AC power; and a control unit that controls, when the trigger switch is operated, the inverter circuit to start converting the DC power supplied from the portable battery pack into the AC power. The control unit restricts the AC power to be supplied to the AC motor until a predetermined time has elapsed since the trigger switch is operated.

It is preferable that the control unit restricts the AC power to be supplied to the AC motor immediately after the trigger switch is operated.

It is preferable that the control unit controls the inverter circuit to increase the AC power to be supplied to the AC motor to a target power.

It is preferable that the control unit controls the inverter circuit to increase the AC power to be supplied to the AC motor to the target power in steps until the predetermined time has elapsed since the trigger switch is operated.

It is preferable that the power supply device further includes: a first switching element that turns on/off to convert the DC power supplied from the portable batter pack into an AC power; and a rectifying/smoothing circuit that converts the AC power converted by the first switching element into a DC power. The inverter circuit converts the DC power outputted from the rectifying/smoothing circuit into the AC power to be supplied to the AC motor. The control unit controls the inverter circuit to increase the AC power to be supplied to the AC motor to the target power in steps by changing a switching duty of the first switching element.

It is preferable that the inverter circuit further includes a plurality of second switching elements that turns on/off to convert the DC power supplied from the portable battery pack into the AC motor. The control unit controls the inverter circuit to increase the AC power to be supplied to the AC motor to the target power in steps by changing a switching duty of the plurality of second switching elements.

It is preferable that the control unit prevents the AC power from being supplied to the AC motor when a battery voltage of the battery pack is smaller than a predetermined voltage.

It is preferable that the battery pack transmits an overdischage signal to the control unit when determining that an overdischarge occurs in the battery pack. The control unit prevents the AC power from being supplied to the AC motor when receiving the overdischarge signal from the battery pack.

It is preferable that the power supply device further includes a halting unit that forcibly halts the inverter circuit regardless of the control unit when a current flowing in the inverter circuit exceeds a predetermined current.

It is preferable that the power supply device further includes a recovery unit that suspends the forcible halt of the inverter circuit when the current falls below the predetermined current after a first predetermined time has elapsed since the halting unit that forcibly has halted the inverter circuit.

It is preferable that the power supply device further includes a preventing unit that prevents the recovery unit from suspending the forcible halt of the inverter circuit when the current exceeds the predetermined current again after a second predetermined time longer than the first predetermined time has elapsed since the current has firstly exceeded the predetermined current.

It is preferable that the halting unit operates at least when the AC motor is started up.

Another aspect of the present invention provides a power supply device connectable to a power tool including an AC motor and a trigger switch. The power supply device includes: an inverter circuit that converts a DC power supplied from a portable battery pack into an AC power to supply the AC power to the AC motor; and a control unit that controls, when the trigger switch is operated, the inverter circuit to start converting the DC power supplied from the portable battery pack into the AC power. The control unit restricts the AC power to be supplied to the AC motor until a predetermined time has elapsed since the trigger switch is operated.

It is preferable that the control unit restricts the AC power to be supplied to the AC motor immediately after the trigger switch is operated.

It is preferable that the control unit controls the inverter circuit to increase the AC power to be supplied to the AC motor to a target power.

It is preferable that the control unit controls the inverter circuit to increase the AC power to be supplied to the AC motor to the target power in steps until the predetermined time has elapsed since the trigger switch is operated.

It is preferable that the power supply device further includes: a first switching element that turns on/off to convert the DC power supplied from the portable batter pack into an AC power; and a rectifying/smoothing circuit that converts the AC power converted by the first switching element into a DC power. The inverter circuit converts the DC power outputted from the rectifying/smoothing circuit into the AC power to be supplied to the AC motor. The control unit controls the inverter circuit to increase the AC power to be supplied to the AC motor to the target power in steps by changing a switching duty of the first switching element.

It is preferable that the inverter circuit further includes a plurality of second switching elements that turns on/off to convert the DC power supplied from the portable battery pack into the AC motor. The control unit controls the inverter circuit to increase the AC power to be supplied to the AC motor to the target power in steps by changing a switching duty of the plurality of second switching elements.

It is preferable that the control unit prevents the AC power from being supplied to the AC motor when a battery voltage of the battery pack is smaller than a predetermined voltage.

It is preferable that the battery pack transmits an overdischage signal to the control unit when determining that an overdischarge occurs in the battery pack. The control unit prevents the AC power from being supplied to the AC motor when receiving the overdischarge signal from the battery pack.

It is preferable that the power supply device further includes a halting unit that forcibly halts the inverter circuit regardless of the control unit when a current flowing in the inverter circuit exceeds a predetermined current.

It is preferable that the power supply device further includes a recovery unit that suspends the forcible halt of the inverter circuit when the current falls below the predetermined current after a first predetermined time has elapsed since the halting unit that forcibly has halted the inverter circuit.

It is preferable that the power supply device further includes a preventing unit that prevents the recovery unit from suspending the forcible halt of the inverter circuit when the current exceeds the predetermined current again after a second predetermined time longer than the first predetermined time has elapsed since the current has firstly exceeded the predetermined current.

It is preferable that the halting unit operates at least when the AC motor is started up.

Advantageous Effects of Invention

The power supply device of the present invention can drive a power tool provided with an AC motor, even in areas where an AC power supply is unavailable.

BRIEF DESCRIPTION OF DRAWINGS

FIG. 12 is a table showing overload determination criteria used for preventing FETs from being turned on in the fourth embodiment.

REFERENCE SIGNS LIST

Figure 1A:
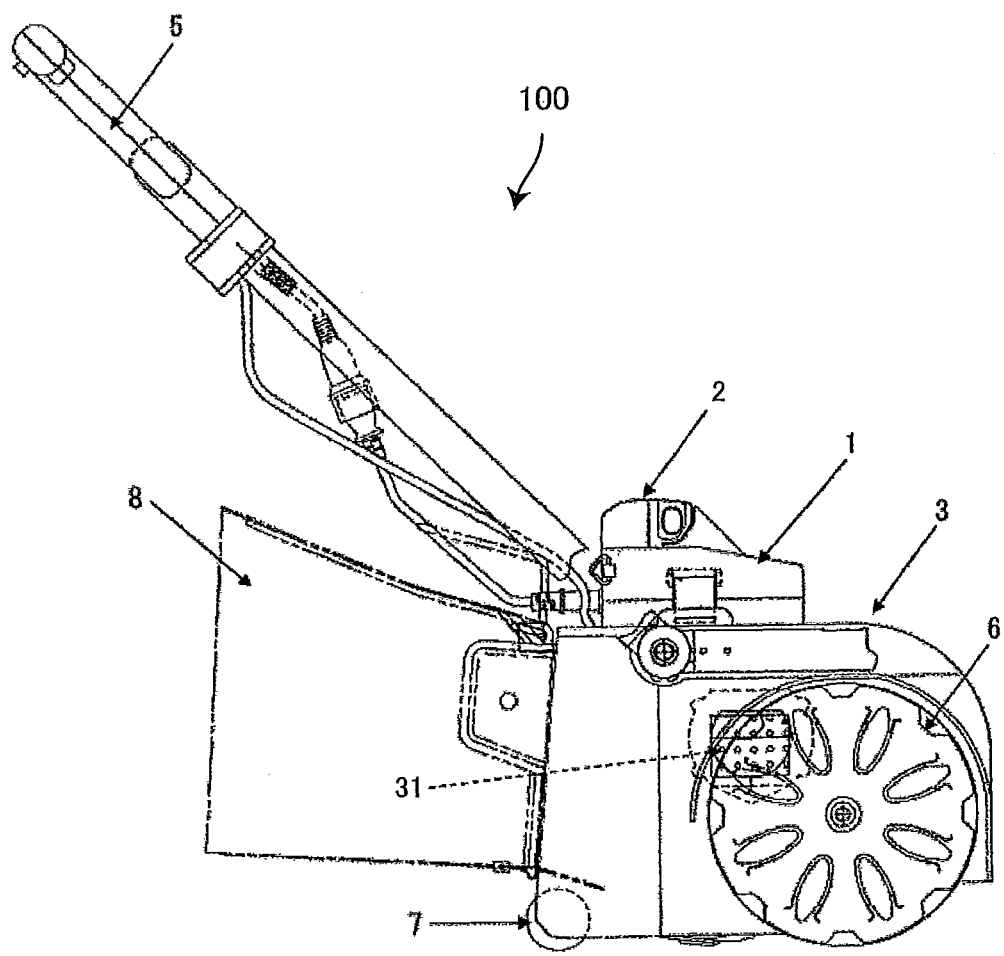
FIG. 1(a) is a side view of a lawn mower equipped with an inverter device according to a first embodiment of the present invention.

100 Power tool system
1 Inverter device
2 Battery pack
3 Power tool

BEST MODE FOR CARRYING OUT THE INVENTION

A power tool system and a power supply device provided in the power tool system according to a first embodiment of the present invention will be described while referring to FIGS. 1 through 4.

A power tool system 100 according to the first embodiment includes an inverter device 1 serving as the power supply device of the present invention, a battery pack 2 that supplies direct current (DC) power, and a power tool 3. The inverter device 1 converts the DC power from the battery pack 2 into AC power and supplies this AC power to an AC motor 31 provided in the power tool 3.

In the preferred embodiment, a lawn mower will be used as the power tool 3, but the power tool of the present invention is not limited to a lawn mower and may be another type of power tool, such as a hedge trimmer, a circular saw, a jigsaw, a grinder, or a driver, provided that the power tool has a trigger switch for driving the tool with AC power.

FIG. 1(a) is a side view of the power tool 3 when the inverter device 1 is connected thereto. The inverter device 1 is detachably mounted on the power tool 3 via a latch (not shown). When an operator grips a handle 5 provided on the power tool 3 and operates a trigger switch 32 described later (see FIG. 2), electric power is supplied from the battery pack 2 to the AC motor 31 via the inverter device 1.

Figure 1B:
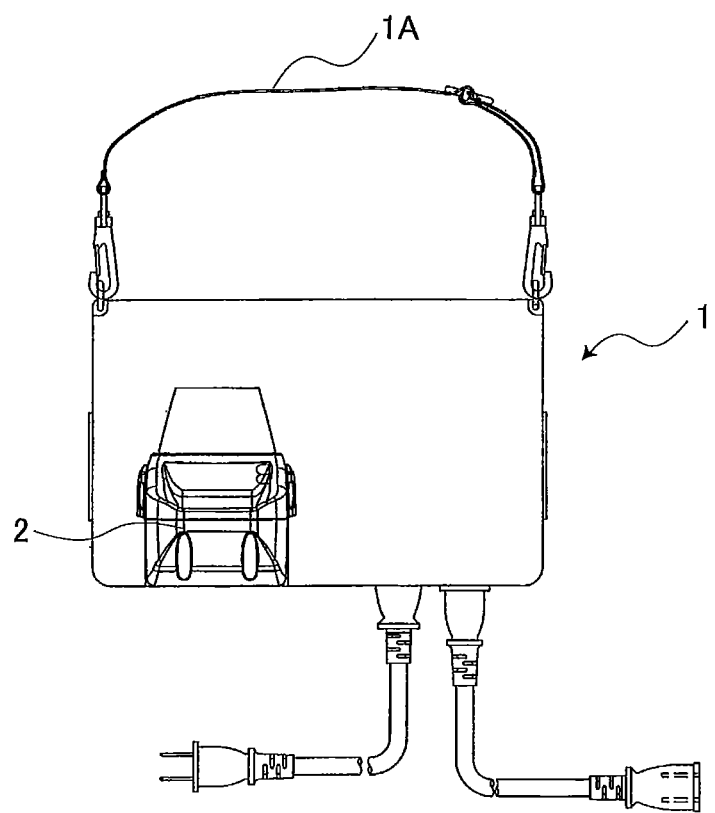
FIG. 1(b) is an explanatory diagram of the inverter device according to the first embodiment after being removed from the lawn mower.

The power tool 3 is given mobility by front wheels 6 disposed near the front side of the power tool 3 with respect to the direction that the power tool 3 is advanced, and rear wheels 7 disposed on the rear side of the power tool 3. A grass bag 8 is detachably provided on the rear side of the power tool 3 for collecting grass clippings and the like cut by a rotating blade (not shown) provided in the power tool 3. As shown in FIG. 1(b), the inverter device 1 is also provided with a shoulder strap 1A for carrying the inverter device 1 when the inverter device 1 has been removed from the power tool 3.

Figure 2:
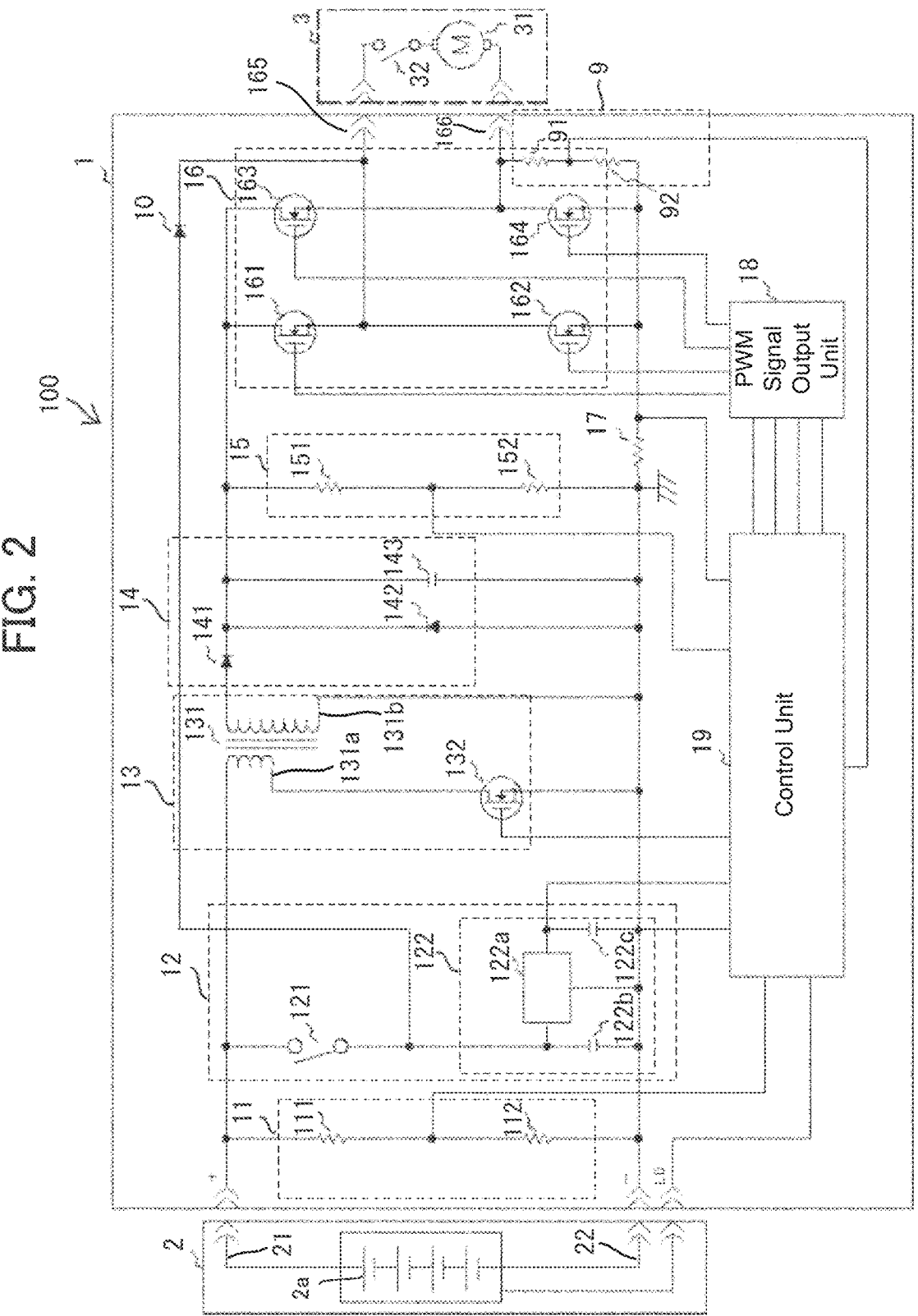
FIG. 2 is a circuit diagram for the inverter device and lawn mower according to the first embodiment.

FIG. 2 is a circuit diagram for the inverter device 1. In the preferred embodiment, when an operator operates the trigger switch 32 of the power tool 3, the inverter device 1 converts DC power supplied from the battery pack 2 to AC power and supplies this AC power to the AC motor 31 of the power tool 3. While the inverter device 1, power tool 3, and battery pack 2 are detachably connected to one another, the following description assumes that these components are connected.

The inverter device 1 includes a battery voltage detection unit 11, a power supply unit 12, a booster circuit 13, a rectifying/smoothing circuit 14, a boost voltage detection unit 15, an inverter circuit 16, a current detection resistor 17, a PWM signal output unit 18, a control unit 19, a power switch detection diode 10, and a trigger detection unit 9.

The battery voltage detection unit 11 includes battery voltage detection resistors 111 and 112. The battery voltage detection resistors 111 and 112 are connected in series between a plus terminal 21 and a minus terminal 22 of the battery pack 2 to output a divided voltage of the battery voltage of the battery pack 2 by the battery voltage detection resistors 111 and 112 to the control unit 19. The battery pack 2 shown in FIG. 1 has four 3.6-V lithium battery cells 2a connected in series for outputting a rated voltage of 14.4 V.

The power supply unit 12 includes a power switch 121 and a constant-voltage circuit 122 connected in series between the plus terminal 21 of the battery pack 2 and the control unit 19. The constant-voltage circuit 122 includes a three-terminal regulator 122a, and oscillation-prevention capacitors 122b and 122c. When an operator turns on the power switch 121, the constant-voltage circuit 122 converts the voltage supplied from the battery pack 2 into a prescribed DC voltage (5 V, for example) and supplies this voltage to the control unit 19 as drive voltage. When the operator switches off the power switch 121, the entire inverter device 1 is turned off because the drive voltage is no longer supplied to the control unit 19.

The booster circuit 13 is configured of a transformer 131, and a field effect transistor (FET) 132. The transformer 131 includes a primary winding 131a, and a secondary winding 131b. The primary winding 131a is connected between the plus terminal 21 and minus terminal 22 of the battery pack 2. The FET 132 is provided between the primary winding 131a of the transformer 131 and the minus terminal 22 of the battery pack 2. The control unit 19 inputs a first PWM signal into the gate of the FET 132 for switching the FET 132 on and off. Through on/off switching of the FET 132, the DC power supplied from the battery pack 2 to the primary winding 131a of the transformer 131 is converted into AC power. The AC voltage of this AC power is stepped up based on the ratio of the number of turns in the secondary winding 131b to the number of turns in the primary winding 131a, and is outputted from the secondary winding 131b.

The rectifying/smoothing circuit 14 is configured of rectifying diodes 141 and 142, and a smoothing capacitor 143. Through this configuration, the rectifying/smoothing circuit 14 converts the AC voltage stepped up by the transformer 131 to DC voltage (140 V, for example).

The boost voltage detection unit 15 includes resistors 151 and 152 connected in series to output a divided voltage of the DC voltage outputted from the rectifying/smoothing circuit 14 (the voltage at the smoothing capacitor 143; 141 V, for example) by the resistors 151 and 152 to the control unit 19.

The inverter circuit 16 is configured of four FETs 161-164. The FETs 161 and 162 are connected in series, and the FETs 163 and 164, with both pairs of FETs being connected to the smoothing capacitor 143 in parallel. More specifically, the drain of the FET 161 is connected to the cathodes of the rectifying diodes 141 and 142, while the source of the FET 161 is connected to the drain of the FET 162. Similarly, the drain of the FET 163 is connected to the cathodes of the rectifying diodes 141 and 142, while the source of the FET 163 is connected to the drain of the FET 164.

The inverter circuit 16 also includes output terminals 165 and 166 that are connected to the AC motor 31 of the power tool 3. The source of the FET 161 and the drain of the FET 162 are connected to the output terminal 165, while the source of the FET 163 and the drain of the FET 164 are connected to the output terminal 166. The PWM signal output unit 18 outputs second PWM signals to the gates of the FETs 161-164 for switching the FETs 161-164 on and off. Through on/off switching of the FETs 161-164, the inverter circuit 16 converts the DC power outputted from the rectifying/smoothing circuit 14 into AC power and supplies this AC power to the power tool 3 (the AC motor 31).

The current detection resistor 17 is connected between the source of the FET 162 (FET 164) and the minus terminal 22 of the battery pack 2. The terminal of the current detection resistor 17 on the high-voltage side is also connected to the control unit 19. With this configuration, the control unit 19 can determine the current flowing to the AC motor 31 based on the voltage detected by the current detection resistor 17.

The anode of the power switch detection diode 10 is connected to the low-voltage side of the power switch 121, while the cathode is connected to the AC motor 31 of the power tool 3 via the output terminal 165. With this configuration, the battery voltage of the battery pack 2 is applied to the AC motor 31 when the power switch 121 is on. Further, since the cathode of the power switch detection diode 10 is also connected to the source of the FET 161, the boosted voltage outputted from the rectifying/smoothing circuit 14 is applied to the AC motor 31 when the FET 161 is on.

The circuit that includes the power switch detection diode 10 constitutes a bypass circuit for applying the battery voltage to the AC motor 31 when the power switch 121 is on. More specifically, the bypass circuit is the circuit connected to the low-voltage side of the power switch 121 and connected to the AC motor 31 via the power switch detection diode 10 and trigger switch 32. In other wards, the battery pack 2 is connected to one end of the trigger switch 32 via the bypass circuit.

The trigger detection unit 9 is connected between the AC motor 31 (and specifically the output terminal 166) and the source of the FET 164 (more specifically, to ground) in parallel to the FET 164. The trigger detection unit 9 is configured of resistors 91 and 92 connected in series. When the trigger switch 32 is operated, the battery voltage of the battery pack 2 is applied to the trigger detection unit 9 via the bypass circuit, the trigger switch 32, and the AC motor 31. The applied voltage is divided by the resistors 91 and 92 and outputted to the control unit 19 as a trigger detection signal. The control unit 19 performs the control of the booster circuit 13 and the inverter circuit 16 while the trigger detection signal is inputted.

Note that the battery voltage is not applied to the AC motor 31 while the power switch 121 is off. Therefore, the unnecessary consumption of power in the battery pack 2 is suppressed when the inverter device 1 is not being driven.

In the preferred embodiment, the bypass circuit is connected to the source of the FET 161, and the trigger detection unit 9 is connected in parallel to the FET 164. However, the bypass circuit may instead be connected to the source of the FET 163, while the trigger detection unit 9 is connected in parallel to the FET 162.

The control unit 19 outputs the first PWM signal to the gate of the FET 132 based on the boosted voltage detected by the boost voltage detection unit 15 in order that the AC voltage outputted from the secondary side of the transformer 131 has the desired effective voltage (141 V, for example). The control unit 19 also outputs the second PWM signals to the gates of the FETs 161-164 via the PWM signal output unit 18 in order that the AC voltage outputted to the AC motor 31 has the desired effective voltage (100 V, for example). In the preferred embodiment, the FETs 161 and 164 are treated as one set (hereinafter referred to as the "first set"), while the FETs 162 and 163 are treated as another set (hereinafter referred to as the "second set"), and the control unit 19 outputs the second PWM signals for alternately turning on and off the first and second sets at a duty cycle of 100%.

The control unit 19 also determines whether over-discharge has occurred in the battery pack 2 based on the battery voltage detected by the battery voltage detection unit 11. More specifically, when the battery voltage detected by the battery voltage detection unit 11 is smaller than a prescribed over-discharge voltage, the control unit 19 determines that over-discharge has occurred in the battery pack 2 and outputs the first and second PWM signals in order to halt output to the AC motor 31. That is, the control unit 19 halts output of the first and second PWM signals.

The battery pack 2 is further provided with a built-in protection circuit or microcomputer and possesses a function for self-detecting over-discharge and for outputting an over-discharge signal to the control unit 19. When the control unit 19 receives an over-discharge signal from the battery pack 2 via a signal terminal LD, the control unit 19 outputs first and second PWM signals in order to halt output to the AC motor 31. That is, the control unit 19 halts output of the first and second PWM signals. This construction can prevent such over-discharge from shortening the lifespan of the battery pack 2.

The control unit 19 of the preferred embodiment further adjusts the duty cycle for AC output in order to increase output from the inverter device 1 to a desired value in steps, when the AC motor 31 is started up. That is, the control unit 19 outputs the second PWM signals in order to restrict the supply of AC voltage to the AC motor 31.

Next, a process performed by the control unit 19 to set the duty cycle of AC output will be described while referring to the flowchart in FIG. 3 and the timing chart for the output voltage in FIG. 4.

Figure 3:
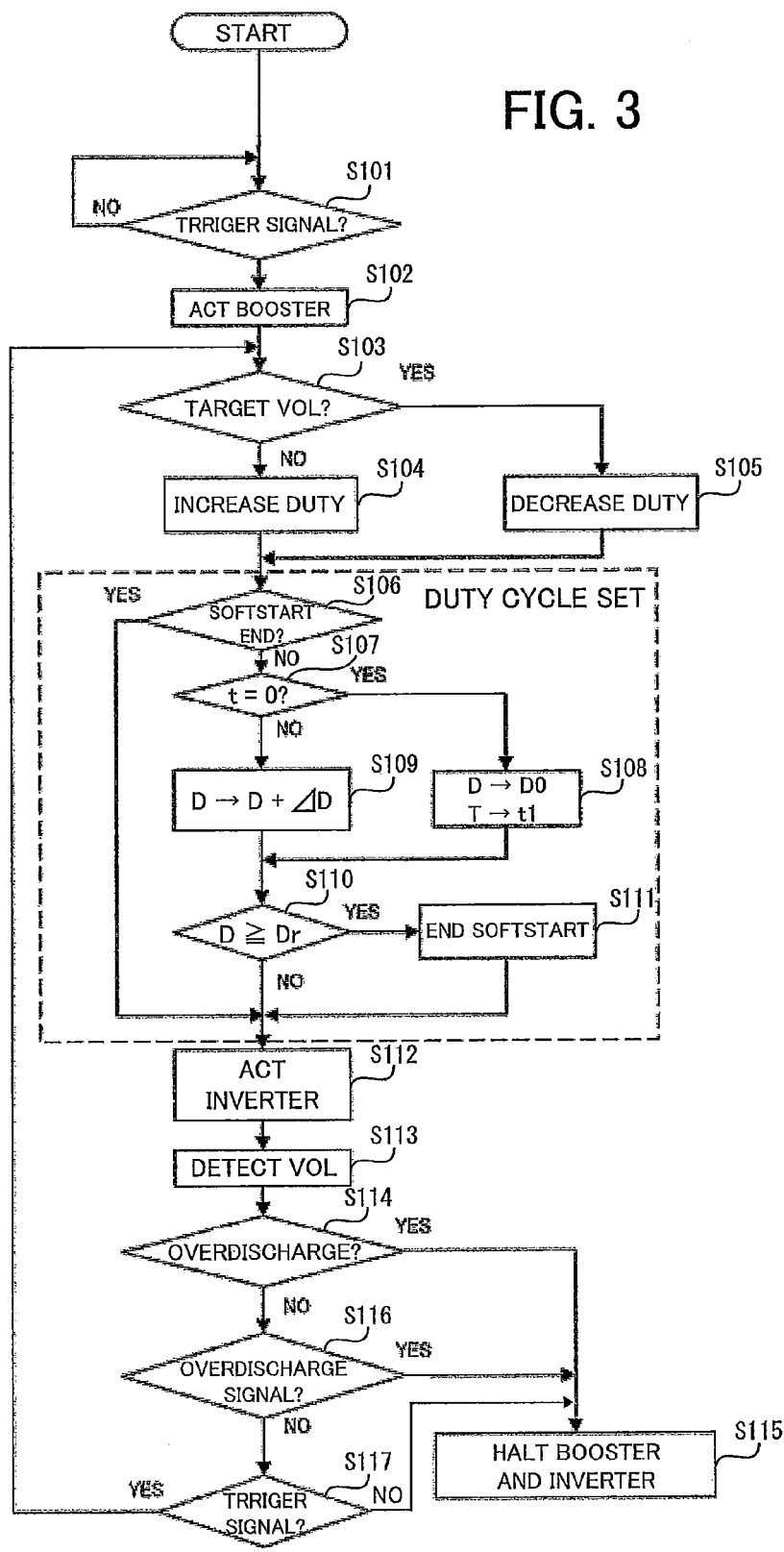
FIG. 3 is a flowchart illustrating steps in a process for controlling the voltage supplied to an AC motor in the lawn mower according to the first embodiment.

The control unit 19 begins the process shown in the flowchart of FIG. 3 when the power switch 121 is turned on while the battery pack 2 is mounted on the inverter device 1 or when the battery pack 2 is mounted on the inverter device 1 while the power switch 121 is in an on state. When the power switch 121 is turned on, the constant-voltage circuit 122 generates a drive voltage for driving the control unit 19 from the battery voltage of the battery pack 2.

In S101 of the flowchart in FIG. 3, the control unit 19 determines whether a trigger detection signal was inputted from the trigger detection unit 9. That is, the control unit 19 determines whether the battery voltage of the battery pack 2 was applied to the trigger detection unit 9 via the bypass circuit that includes the power switch detection diode 10. If a trigger detection signal was inputted (S101: YES), the control unit 19 determines that the trigger switch 32 is on. Accordingly, in S102 the control unit 19 outputs the first PWM signal for switching the FET 132 on and off to the gate of the FET 132, activating the boosting effect of the transformer 131.

In S103 the control unit 19 determines whether the boosted voltage is greater than a target voltage (140 V in the preferred embodiment) based on the voltage detected by the boost voltage detection unit 15. If the boosted voltage is greater than the target voltage (S103: YES), in S104 the control unit 19 outputs the first PWM signal having a reduced duty cycle to the gate of the FET 132. However, if the boosted voltage is less than or equal to the target voltage (S103: NO), in S105 the control unit 19 outputs the first PWM signal having an increased duty cycle to the gate of the FET 132.

Next, the control unit 19 sets the duty cycle for AC output. For this setting, in S106 the control unit 19 first determines whether an end-of-soft-start flag has been set. Since the end-of-soft-start flag is not set until S111, to be described later, the determination in S106 will always be "NO" for the first pass.

In S107 the control unit 19 determines whether an elapsed time t=0. Since t=0 in the first determination of S107 (S107: YES), in S108 the control unit 19 sets an AC output duty cycle D to an initial value D0 and changes t to t1. On the other hand, since t is not 0 in the second and subsequent determinations (S107: NO), in S109 the control unit 19 performs a soft start by increasing the AC output duty cycle D by only ΔD. In the preferred embodiment, ΔD (the rate of increase in the duty cycle ΔD/Δt) is set to a value between 33-100 (%/sec). In other words, the control unit 19 controls the duty cycle so that a time τ during which the FET is on increases gradually within a prescribed interval T indicated in the output voltage of FIG. 4.

In S110 the control unit 19 determines whether the AC output duty cycle D is greater than or equal to a prescribed duty cycle Dr. If the AC output duty cycle D is greater than or equal to the prescribed duty cycle Dr (S110: YES), the control unit 19 determines that the output of the inverter device 1 has reached a steady state, ends the soft start in S111, and advances to S112. Here, the prescribed duty cycle Dr corresponds to the target voltage. In the preferred embodiment, the prescribed duty cycle Dr is set to 100% but is not restricted to this value.

However, if the AC output duty cycle D is less than the prescribed duty cycle Dr (S110: NO), the control unit 19 determines that the output of the inverter device 1 has not yet reached a steady state and advances directly to S112.

In S112 the control unit 19 outputs the second PWM signals for switching on and off the FETs 161-164 to the inverter circuit 16 for supplying an AC power to the AC motor 31. The second PWM signals are specifically outputted from the PWM signal output unit 18 to the gates of the FETs 161-164.

In S113 the battery voltage detection unit 11 detects the battery voltage, and in S114 the control unit 19 determines whether the voltage detected by the battery voltage detection unit 11 is smaller than a prescribed over-discharge voltage. If the detected battery voltage is smaller than the prescribed over-discharge voltage (S114: YES), the control unit 19 determines that the battery pack 2 is in an over-discharge state. Accordingly, in S115 the control unit 19 outputs first and second PWM signals for shutting off the FET 132 and the FETs 161-164 in order to halt operations of the booster circuit 13 and inverter circuit 16, thereby halting the supply of voltage from the battery pack 2.

However, if the battery voltage is greater than or equal to the over-discharge voltage (S114: NO), in S116 the control unit 19 determines whether an over-discharge signal was inputted from the battery pack 2. When an over-discharge has been inputted (S116: YES), then in S115 the control unit 19 halts the operations of the booster circuit 13 and inverter circuit 16 according to the same process described when the battery voltage is smaller than the prescribed over-discharge voltage (S114: YES).

However, if an over-discharge signal was not inputted (S116: NO), in S117 the control unit 19 determines again whether a trigger detection signal has been inputted from the trigger detection unit 9. If a trigger detection signal has been inputted (S117: YES), the control unit 19 returns to S103 and repeats the operations described above. Through this process, the output voltage and output current change as shown in FIG. 4, and the control unit 19 determines that output has reached a steady state when the AC output duty cycle D exceeds the prescribed duty cycle Dr (S110: YES) and subsequently halts the soft start operation. On the other hand, if a trigger detection signal was not inputted (S117: NO), in S115 the control unit 19 halts the operations of the booster circuit 13 and inverter circuit 16.

Figure 4:
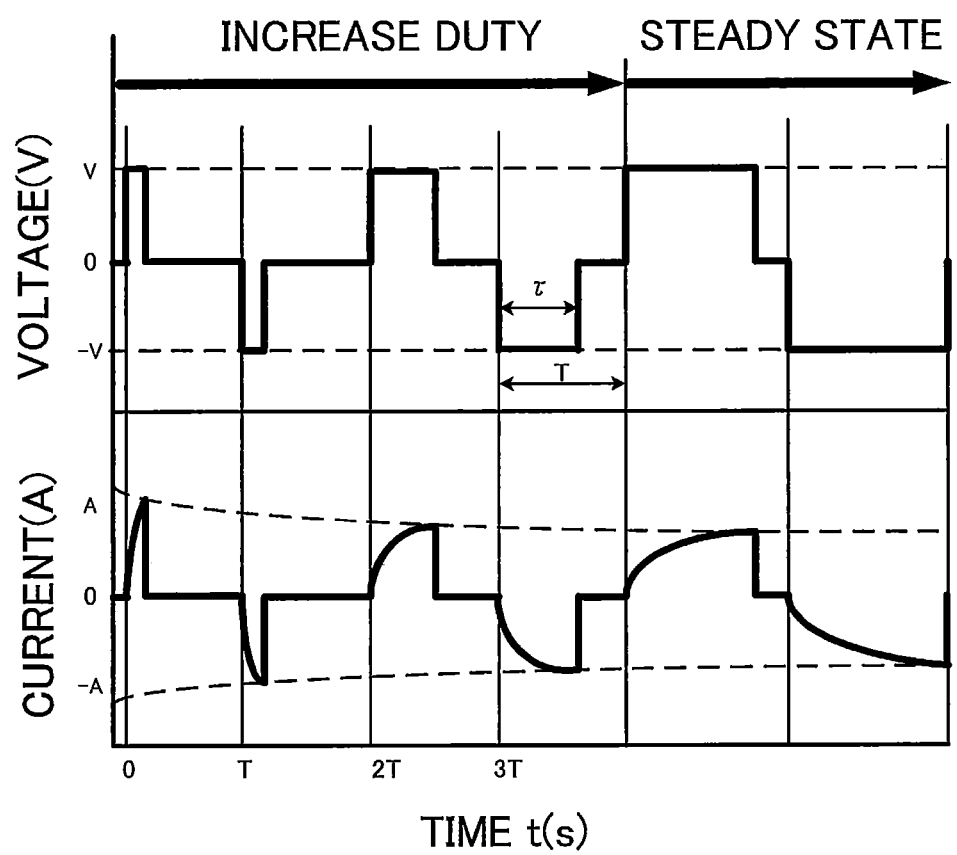
FIG. 4 is a timing chart showing the output voltage of the inverter according to the first embodiment in relation to time.

As described above, the inverter device 1 according to the preferred embodiment sets the AC output duty cycle and outputs second PWM signals for increasing output from the inverter device 1 in steps up to a target value, as indicated in the Increasing Duty Cycle region of FIG. 4, when the AC motor 31 is started up. Accordingly, the effective output of the inverter device 1 increases along with the increase in the PWM signal. Since the current flowing through the battery pack 2 and AC motor 31 also gradually increases, as indicated by the output current in FIG. 4, this method can prevent a large current from flowing in the battery pack 2 when starting the power tool 3, which current can reduce the life of the battery pack 2. This method simultaneously prevents a large current from flowing to the inverter circuit 16, and particularly the FETs 161-164, thereby reducing any adverse effects on the inverter circuit 16.

By connecting the battery pack 2 and the inverter device 1 to the power tool 3 in the power tool system of the preferred embodiment, the power tool 3 can be driven in areas with no available AC power and thus can be moved freely during operations.

By suppressing the amount of current flowing in the AC motor 31 at startup, the power tool system can reduce the amount of load applied to the battery pack 2 and inverter device 1 at startup. Hence, even when using a portable battery pack having a low discharge capacity in the power tool system of the preferred embodiment in order to be small and compact, the battery pack can be used to start power tools that tend to produce a large continuous current at startup, including power tools that rotate large diameter blades, such as circular saws, grass trimmers, and lawn mowers, and power tools such as a hedge trimmer that have a plurality of blades sliding against one another.

In the preferred embodiment, output from the inverter device 1 is increased in steps up to a target value by varying the second PWM signal, but output from the inverter device 1 may be increased in steps by modifying the first PWM signal instead. In the latter case, the voltage of the smoothing capacitor 143 is gradually increased by gradually increasing the first PWM signal (the FET 132), while fixing the second PWM signal (100% duty cycle). This method can prevent a large current from flowing to the battery pack 2, inverter circuit 16, and booster circuit 13, and can reduce the effects on components of the power tool system 100. It is also possible to gradually increase both the first and second PWM signals.

While the battery pack 2 in the preferred embodiment is described as a lithium battery pack having a battery voltage of 14.4 V, the inverter device 1 may be configured to be selectively connectable to a plurality of battery packs with different types or voltages of batteries. In this case, various battery packs may be prepared for the types and uses of power tools. Accordingly, the power tool system can perform suitable control to suppress power consumption in the battery pack by modifying the soft start control based on the type of battery pack being used.

Although there are numerous types of power tools, one type of power tool is driven by an AC power source at 100 V. In this case, the power tool system can prevent a large current from flowing in the battery pack and power tool, regardless of the type of battery pack and power tool, by performing soft start control of the booster circuit 13 and inverter circuit 16 based on the type of battery pack or power tool connected to the inverter device 1 so that output from the inverter device 1 remains steady at 100 V. In this way, the power tool system can avoid reducing the lifespan of the battery pack.

For example, the battery pack may be provided with identifying means (a resistor, for example) possessing information on the battery voltage, type, and the like. The control unit 19 can determine the type of battery pack that is connected to the 1 by reading the resistance value of the identifying means and, based on the identified battery pack, can modify the soft start control process (the method of switching the FET 132 on and off and modifying the rate of increase in the duty cycle of the FETs 161-164). Similarly, the control unit 19 can also determine the type of power tool connected to the inverter device 1 and can modify the soft start control process based on this detected type.

Note that when an AC voltage other than 100 V is employed, such as when using an AC power source in a country other than Japan, soft start control should be executed toward that voltage.

When voltage is supplied from a source other than the battery pack 2 in the power tool system, the power tool system can also reduce adverse effects on the power source and the inverter circuit 16.

Further, in the first embodiment, the duty cycle Dr corresponding to the target voltage is set to 100% regardless the operated amount of the trigger switch 32. However, the duty cycle Dr is changed in accordance with the operated amount of the trigger switch 32 (for example, the duty cycle Dr is set to 50% if the operated amount of the trigger switch 32 is 50% of the maximum operated amount). In this case, the duty increase period may be also changed in accordance with the operated amount of the trigger switch 32 (for example, the duty increase period is set to a half of the duty increase period shown in FIG. 4 if the operated amount of the trigger switch 32 is 50% of the maximum operated amount).

In the flowchart of FIG. 3, an overcurrent detection may be further performed. Specifically, the control unit 19 halts the operations of the booster circuit unit 13 and inverter circuit 16 when the current detected by the current detection resistor 17 has exceeded a predetermined current. With this construction, it can prevented that the battery pack 2, the AC motor 32, and FETs 132 and 161-164 are damaged due to the heat generated by the overcurrent.

Next, an inverter device 1 according to a second embodiment of the present invention will be described with reference to FIGS. 5 through 7.

Figure 5:
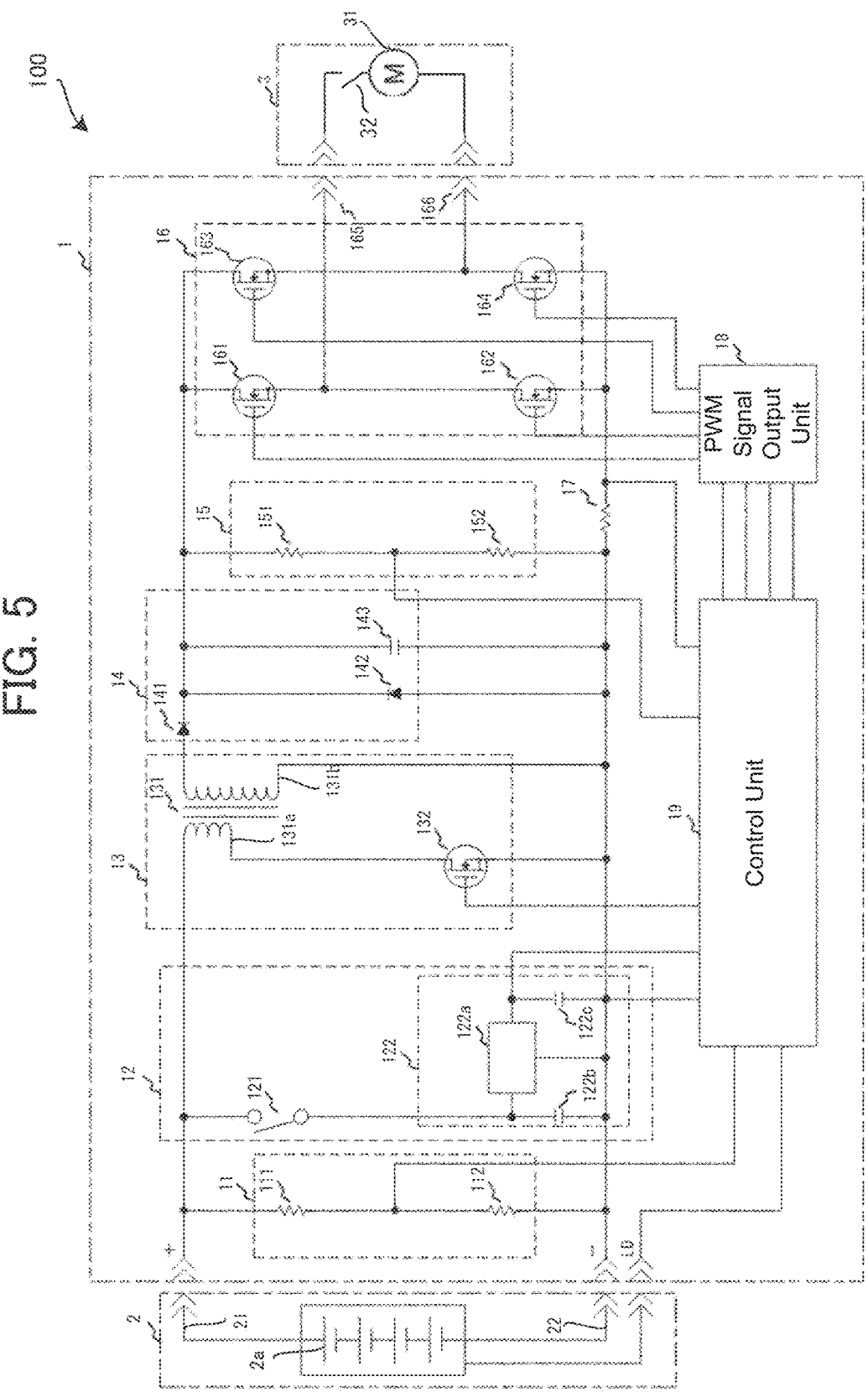
FIG. 5 is a circuit diagram for an inverter device according to a second embodiment of the present invention.

FIG. 5 is a circuit diagram for the inverter device 1 according to the second embodiment. The inverter device 1 according to the second embodiment has the same configuration as the inverter device 1 according to the first embodiment shown in FIG. 2, except the power switch detection diode 10 and trigger detection unit 9 have been omitted.

While the power tool 3 is configured to operate with voltage within a suitable range, the voltage supplied to the power tool 3 (the AC motor 31) may decrease due to a decrease in the battery voltage during use or a decrease in voltage during an overload condition. Consequently, there is a possibility that the power tool 3 connected to the inverter device 1 may malfunction as a result of a voltage outside the suitable range being supplied thereto.

Figure 6:
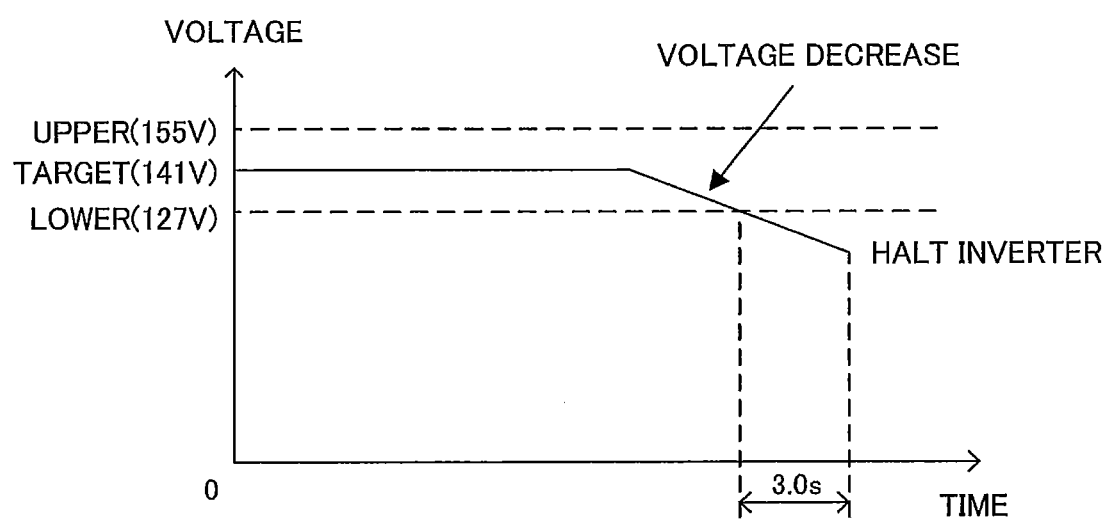
FIG. 6 is a timing chart illustrating a process to halt output from the inverter device according to the second embodiment.

Therefore, the control unit 19 according to the second embodiment outputs first and second PWM signals for halting output to the AC motor 31 when the voltage boosted by the booster circuit 13 (the voltage at the smoothing capacitor 143 detected by the boost voltage detection unit 15) is outside a prescribed range defined by an upper limit (155 V in the preferred embodiment) and a lower limit (127 V), as illustrated in the timing chart of FIG. 6. Specifically, the control unit 19 halts output of the first and second PWM signals in this case.

Here, the control process performed by the control unit 19 according to the second embodiment for halting output to the AC motor 31 will be described with reference to the flowchart in FIG. 7. The control unit 19 begins the process in FIG. 7 either when the power switch 121 is turned on while the battery pack 2 is mounted on the inverter device 1 or when the battery pack 2 is mounted on the inverter device 1 while the power switch 121 is in an ON state. When the power switch 121 is turned on, the constant-voltage circuit 122 generates a drive voltage for driving the control unit 19 from the battery voltage of the battery pack 2.

Figure 7:
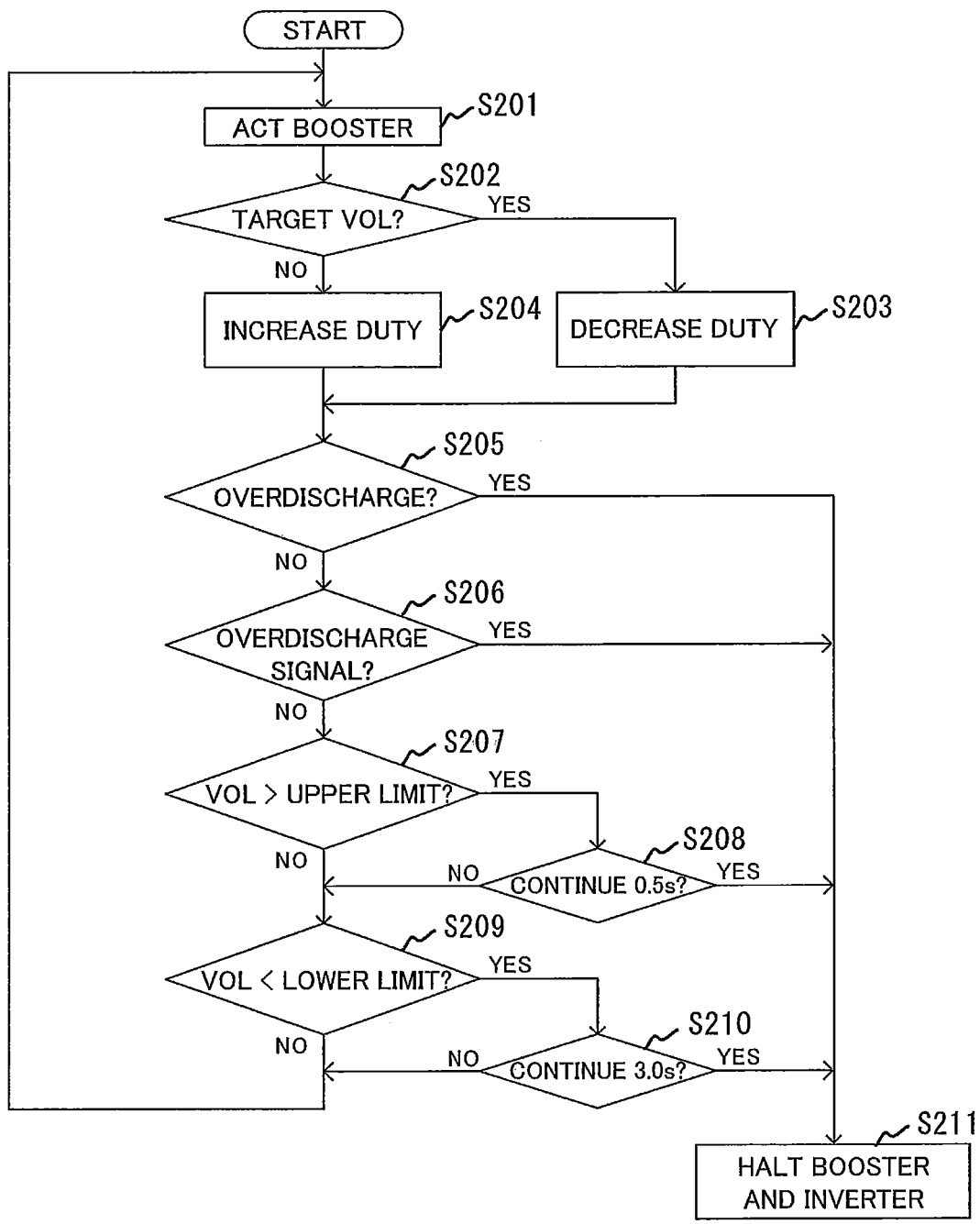
FIG. 7 is a flowchart illustrating steps in a process for halting output from the inverter device according to the second embodiment.

In S201 of the flowchart in FIG. 7, the control unit 19 outputs the first PWM signal to the gate of the FET 132 in order that the AC voltage outputted from the secondary side of the transformer 131 has the desired effective voltage (141 V, for example). In S202 the control unit 19 determines whether the effective voltage boosted by the transformer 131 is greater than the target voltage based on the voltage detected by the boost voltage detection unit 15.

If the boosted voltage is greater than the target voltage (S202: YES), in S203 the control unit 19 reduces the duty cycle of the FET 132. When the boosted voltage is less than or equal to the target voltage (S202: NO), in S204 the control unit 19 increases the duty cycle of the FET 132.

In S205 the control unit 19 determines whether the battery voltage of the battery pack 2 is less than a prescribed over-discharge voltage based on the voltage detected by the battery voltage detection unit 11. If the battery voltage is less than the prescribed over-discharge voltage (S205: YES), then the control unit 19 determines that the battery pack 2 is in an over-discharge state. Accordingly, in S211 the control unit 19 outputs first and second PWM signals for halting output to the AC motor 31. Specifically, the control unit 19 halts output of the first and second PWM signals. As a result, operations of the booster circuit 13 and inverter circuit 16 are shut down, thereby halting output from the inverter device 1 to the AC motor 31.

However, if the battery voltage of the battery pack 2 is greater than or equal to the prescribed over-discharge voltage (S205: NO), in S206 the control unit 19 determines whether an over-discharge signal was inputted from the battery pack 2 via the LD terminal. If an over-discharge signal was inputted (S206: YES), then the control unit 19 determines that the battery pack 2 is in an over-discharge state. Accordingly, in S211 the control unit 19 outputs the first and second PWM signals for halting output to the AC motor 31. Specifically, the control unit 19 halts output of the first and second PWM signals.

If an over-discharge signal was not inputted (S206: NO), in S207 the control unit 19 determines whether the boosted voltage is greater than a prescribed upper limit (155 V in the preferred embodiment). If the boosted voltage is greater than the upper limit (S207: YES), in S208 the control unit 19 determines whether the state in which the boosted voltage is greater than the prescribed upper limit has continued for more than 0.5 seconds. If the high boosted voltage has continued for this time (S208: YES), in S211 the control unit 19 outputs the first and second PWM signals for halting output to the AC motor 31.

If a power tool is used when the boosted voltage remains continuously higher than the prescribed upper limit, the motor of the power tool will rotate at a speed greater than the rated value. By halting output to the motor if the state of the boosted voltage continues more than a prescribed time, the inverter device 1 can prevent damage to the power tool. The inverter device 1 can simultaneously prevent damage to components in the inverter device 1, such as the FETs in the inverter circuit 16. Although it is rare during normal operations for the boosted voltage to rise above the prescribed upper limit, this type of control process effectively protects the inverter device 1 should the control unit 19 or boost voltage detection unit 15 responsible for controlling the boosted voltage become damaged.

In some cases, the voltage will rise or fall temporarily due to noise and the like. Halting output to the AC motor 31 even in these cases could cause the power tool 3 to malfunction. Therefore, output to the AC motor 31 is only halted in the preferred embodiment when the boosted voltage remains higher than the prescribed upper limit continuously for at least 0.5 seconds.

On the other hand, if the boosted voltage is less than or equal to the prescribed upper limit (S207: NO) or if the boosted voltage did not remain in a state greater than the prescribed upper limit for a continuous 0.5 seconds or more (S208: NO), then in S209 the control unit 19 determines whether the boosted voltage is less than a prescribed lower limit (127 V in the preferred embodiment). If the boosted voltage is smaller than the lower limit (S209: YES), in S210 the control unit 19 determines whether the boosted voltage has been in a state lower than the prescribed lower limit for a continuous 3.0 seconds or greater. If the boosted voltage has been in this state continuously for the prescribed time (S210: YES), in S211 the control unit 19 outputs the first and second PWM signals for halting output to the AC motor 31.

On the other hand, if the boosted voltage is greater than or equal to the prescribed lower limit (S209: NO) or if the boosted voltage did not remain in a state lower than the prescribed lower limit continuously for 3.0 seconds or more (S210: NO), the control unit 19 returns to S201.

As described above, the inverter device 1 according to the preferred embodiment halts output to the AC motor 31 when the voltage boosted by the booster circuit 13 (the voltage detected by the boost voltage detection unit 15) falls outside the prescribed range defined by an upper limit (155 V) and a lower limit (127 V). Hence, the inverter device 1 can prevent a malfunction of the electronic equipment caused when a voltage outside the suitable range is supplied thereto.

Further, the inverter device 1 halts output to the AC motor 31 only when the detected voltage has remained continuously outside the prescribed range for a prescribed time or greater. Thus, the inverter device 1 can prevent output to the AC motor 31 from being halted when the voltage rises or drops temporarily due to noise and the like.

While the inverter device 1 is configured to output the first and second PWM signals for halting output to the AC motor 31 in the preferred embodiment described above, the inverter device 1 may be configured to output only one of the PWM signals for halting output to the AC motor 31. Specifically, the inverter device 1 can halt output to the AC motor 31 by halting output of one of the first PWM signal and the second PWM signals. However, halting output of both first and second PWM signals can suppress power consumption in the battery pack 2.

In the preferred embodiment described above, 155 V and 127 V are used respectively as the upper and lower limits of the prescribed range, but the prescribed range is not limited to these boundaries.

Further, the battery pack 2 that is connected to the inverter device 1 in the preferred embodiment described above is a 14.4-V lithium battery pack, but the inverter device 1 may be configured to be connectable to different types of battery packs in addition to those housing lithium batteries, such as battery packs configured of nickel cadmium batteries or nickel metal hydride batteries, or may be configured to be connectable to a plurality of battery packs with various battery voltages.

Further, the steps for controlling the boosted voltage in S201-S204, for detecting over-discharge in S205-S206, and for controlling the halting of output in S207-S210 may be performed at any position in the flowchart or may be performed in parallel.

The inverter device 1 may also store a count value indicating the number of times that output to the AC motor 31 was halted due to the voltage boosted by the booster circuit 13 being outside the prescribed range, and may display this history of halted output. In addition, the inverter device 1 may be configured to notify the user that the battery pack 2 has reached the end of its service life when output to the AC motor 31 has been halted more than a prescribed number of times.

In the flowchart of FIG. 7, an overcurrent detection may be further performed. Specifically, the control unit 19 halts the operations of the booster circuit unit 13 and inverter circuit 16 when the current detected by the current detection resistor 17 has exceeded a predetermined current. With this construction, it can prevented that the battery pack 2, the AC motor 32, and FETs 132 and 161-164 are damaged due to the heat generated by the overcurrent.

Next, an inverter device 1 according to a third embodiment of the present invention will be described with reference to FIGS. 8 through 10.

Figure 8:
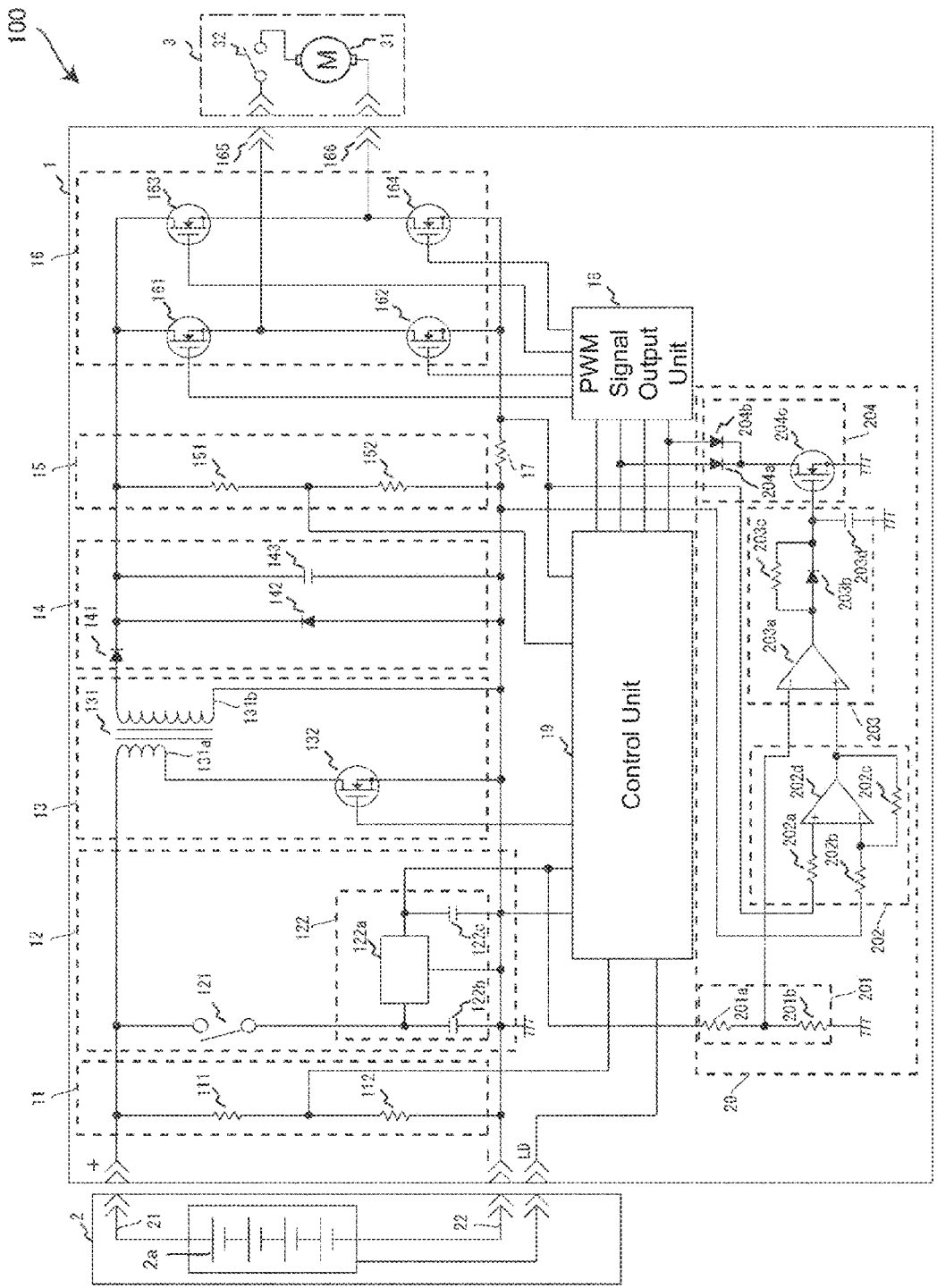
FIG. 8 is a circuit diagram for an inverter device according to a third embodiment of the present invention.

FIG. 8 is a circuit diagram of the inverter device 1 according to the third embodiment. The circuit shown in FIG. 8 has the same configuration as the circuit shown in FIG. 5, except that the inverter device 1 according to the third embodiment is also provided with an inverter circuit shut-off unit (halting unit) 20.

The inverter circuit shut-off unit 20 includes a reference current input unit 201, a detected current input unit 202, a comparator circuit 203, and a shut-down circuit 204.

The reference current input unit 201 is configured of resistors 201a and 201b. The resistors 201a and 201b divide the prescribed DC voltage outputted from the three-terminal regulator 122a, and the reference current input unit 201 outputs this voltage to the comparator circuit 203 as a reference current. The resistors 201a and 201b are set to values for producing a reference current at an overcurrent threshold value.

The detected current input unit 202 includes resistors 202a-202c, and an op amp 202d. The detected current input unit 202 amplifies the current (voltage) detected by the current detection resistor 17 and outputs this current to the comparator circuit 203 as a detected current.

The comparator circuit 203 includes an op amp 203a, a diode 203b, a discharge resistor 203c, and a capacitor 203d. The comparator circuit 203 functions as a differential amplifier circuit.

The op amp 203a compares the inputted reference current and detected current, outputs a low-level signal when the detected current is no greater than the reference current, and outputs a high-level signal when the detected current is higher than the reference current. When a high-level signal is outputted, i.e., when the current flowing in the inverter device 1 is greater than the overcurrent threshold, a charge is accumulated in the capacitor 203d via the diode 203b.

The shut-down circuit 204 includes diodes 204a and 204b, and an FET 204c. The anodes of the diodes 204a and 204b are respectively connected to lines outputting the second PWM signal from the control unit 19 to the PWM signal output unit 18, and specifically, the lines outputting the second PWM signal to the gates of the FETs 162 and 164. The cathodes of the diodes 204a and 204b are connected to the drain of the FET 204c. The gate of the FET 204c is connected to the cathode of the diode 203b, while the source is connected to ground.

With this construction, the FET 204c is turned on when the capacitor 203d has accumulated at least a prescribed charge. When the FET 204c is on, the second PWM signals that are expected to be outputted to the gates of the FETs 162 and 164 flows to ground via the FET 204c. Accordingly, the FETs 162 and 164 are turned off, and the inverter circuit 16 is forcibly shut down. Since the inverter circuit 16 is shut down when the current flowing in the inverter device 1 is greater than the overcurrent threshold in this way, the inverter device 1 can prevent malfunctions in the inverter device 1, and particularly in the FETs 161 and 164 of the inverter circuit 16.

When the inverter circuit 16 is shut down, the control unit 19 no longer detects current (voltage) through the current detection resistor 17; that is, the current detected through the current detection resistor 17 decreases. Therefore, output from the op amp 203a is switched to the low level, and the voltage accumulated in the capacitor 203d is discharged via the discharge resistor 203c connected in parallel to the diode 203b. Since the FET 204c is once again turned off as a result, the forcible shut-down of the inverter circuit 16 is canceled after the overcurrent is eliminated. Thus, the diode 203b, discharge resistor 203c, and capacitor 203d and the like constitute a recovery unit.

Figure 9A:
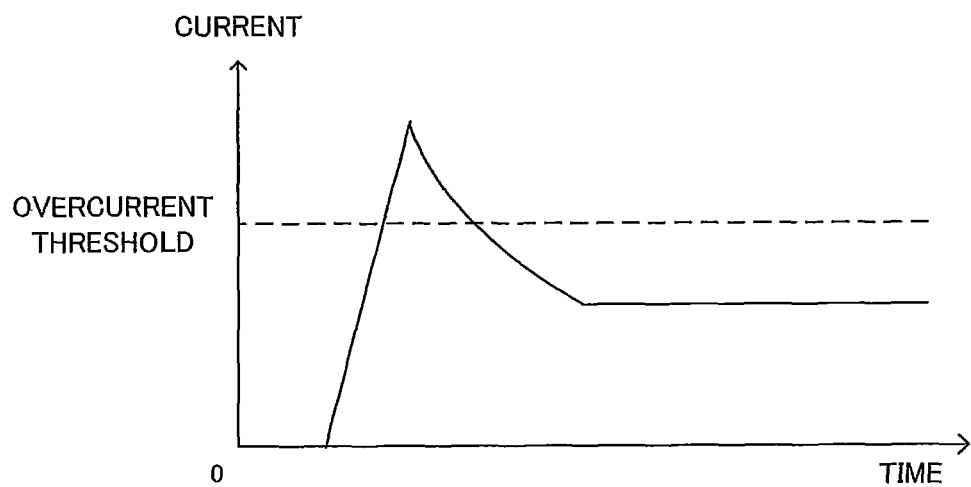
FIG. 9(a) is a timing chart illustrating a starting current.

However, a starting current that is large enough to be an overcurrent flows in the inverter device 1 at startup, as illustrated in FIG. 9(a). Hence, if the inverter circuit 16 were shut down due to the starting current, it would be impossible to start up the inverter device 1.

Figure 9B:
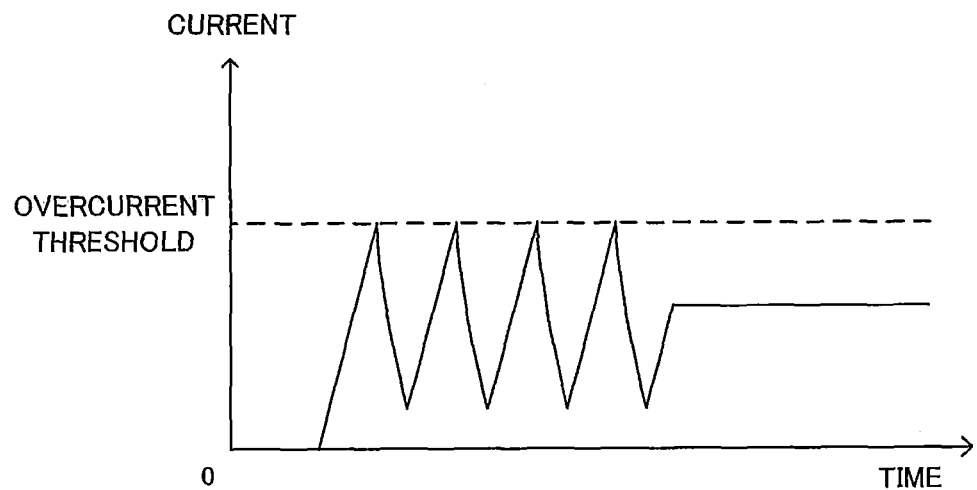
FIG. 9(b) is a timing chart illustrating how the electric current changes when starting up the motor of the lawn mower according to the third embodiment.

As shown in FIG. 9(b), the inverter device 1 according to the third embodiment repeats an operation to halt the inverter circuit 16 and to cancel this stoppage before the AC motor 31 ceases to rotate, thereby restricting the supply of AC voltage to the AC motor 31. Through this configuration, the inverter device 1 according to the preferred embodiment prevents an overcurrent at startup while simultaneously achieving a soft start.

Next, the soft start process according to the preferred embodiment will be described with reference to the flowchart in FIG. 10.

Figure 10:
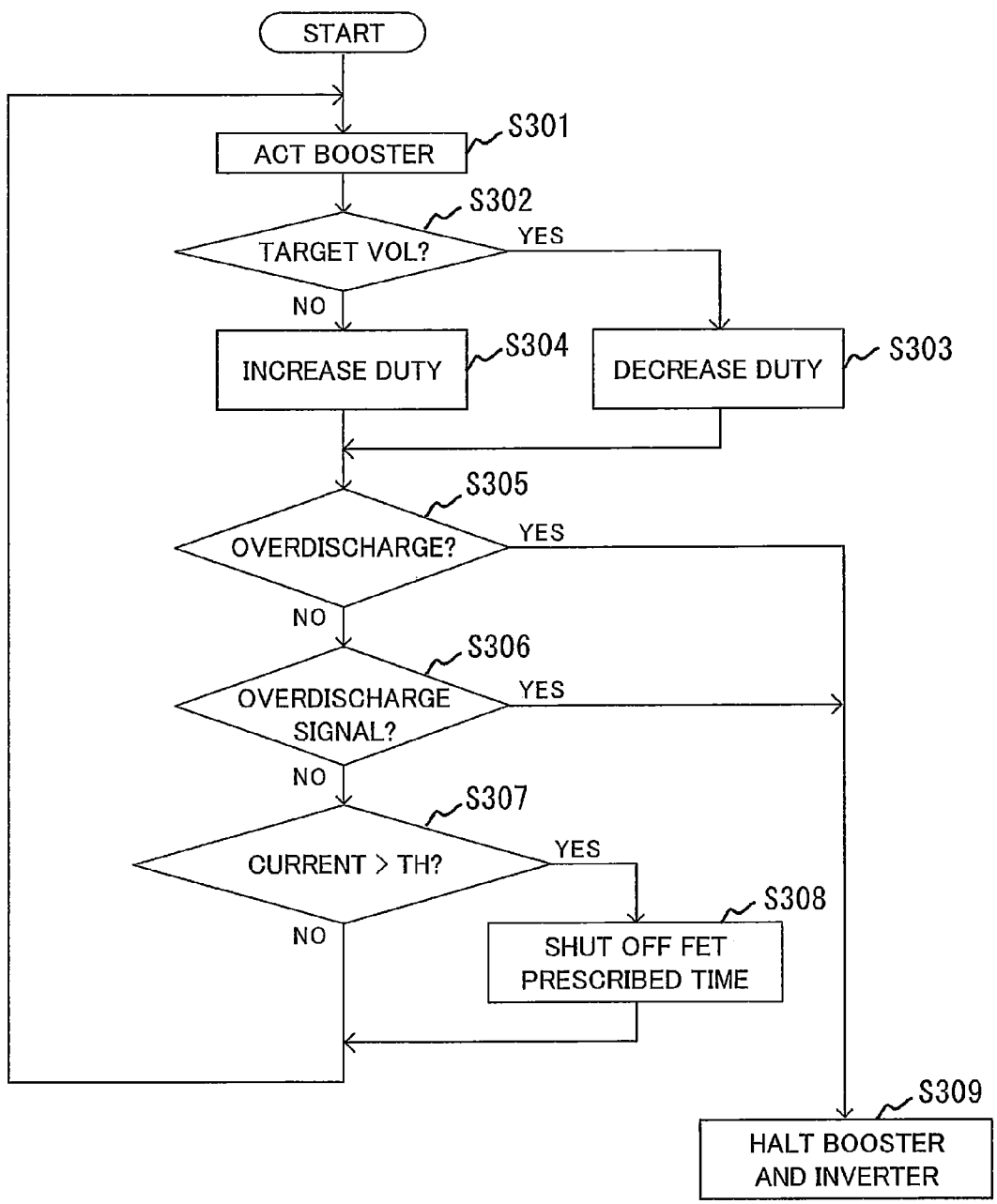
FIG. 10 is a flowchart illustrating steps in a process to halt the inverter circuit according to the third embodiment.

The control unit 19 begins the process in FIG. 10 either when the power switch 121 is turned on while the battery pack 2 is mounted on the inverter device 1 or when the battery pack 2 is mounted on the inverter device 1 while the power switch 121 is in an ON state. When the power switch 121 is turned on, the constant-voltage circuit 122 generates a drive voltage for driving the control unit 19 from the battery voltage of the battery pack 2.

In S301 of the flowchart in FIG. 10, the control unit 19 outputs the first PWM signal to the gate of the FET 132 in order that the AC voltage outputted from the secondary side of the transformer 131 has the desired effective voltage (141 V, for example). In S302 the control unit 19 determines whether the effective voltage boosted by the transformer 131 is greater than the target voltage based on the voltage detected by the boost voltage detection unit 15.

If the boosted voltage is greater than the target voltage (S302: YES), in S303 the control unit 19 reduces the duty cycle of the FET 132. When the boosted voltage is less than or equal to the target voltage (S302: NO), in S304 the control unit 19 increases the duty cycle of the FET 132.

In S305 the control unit 19 determines whether the battery voltage of the battery pack 2 is less than a prescribed over-discharge voltage based on the voltage detected by the battery voltage detection unit 11. If the battery voltage is less than the prescribed over-discharge voltage (S305: YES), then the control unit 19 determines that the battery pack 2 is in an over-discharge state. Accordingly, in S309 the control unit 19 outputs first and second PWM signals for halting output to the AC motor 31. Specifically, the control unit 19 halts output of the first and second PWM signals. As a result, operations of the booster circuit 13 and inverter circuit 16 are shut down, thereby halting output from the inverter device 1 to the AC motor 31.

However, if the battery voltage of the battery pack 2 is greater than or equal to the prescribed over-discharge voltage (S305: NO), in S306 the control unit 19 determines whether an over-discharge signal was inputted from the battery pack 2 via the LD terminal. If an over-discharge signal was inputted (S306: YES), then the control unit 19 determines that the battery pack 2 is in an over-discharge state. Accordingly, in S309 the control unit 19 outputs the first and second PWM signals for halting output to the AC motor 31. Specifically, the control unit 19 halts output of the first and second PWM signals.

If an over-discharge signal was not inputted (S306: NO), soft start control using the inverter circuit shut-off unit 20 is performed.

Specifically, if the electric current flowing in the inverter device 1 is greater than an overcurrent threshold (S307: YES), in S308 the second PWM signals to the FETs 162 and 164 are forcibly shut off by the shut-down circuit 204 for a prescribed time, and subsequently returns to S301. In order to start up the inverter device 1, the prescribed time must be a length of time that elapses after shutting down the inverter circuit 16 before the AC motor 31 stops rotating. In the preferred embodiment, the prescribed time is set to 0.5 msec.

Figure 9C:
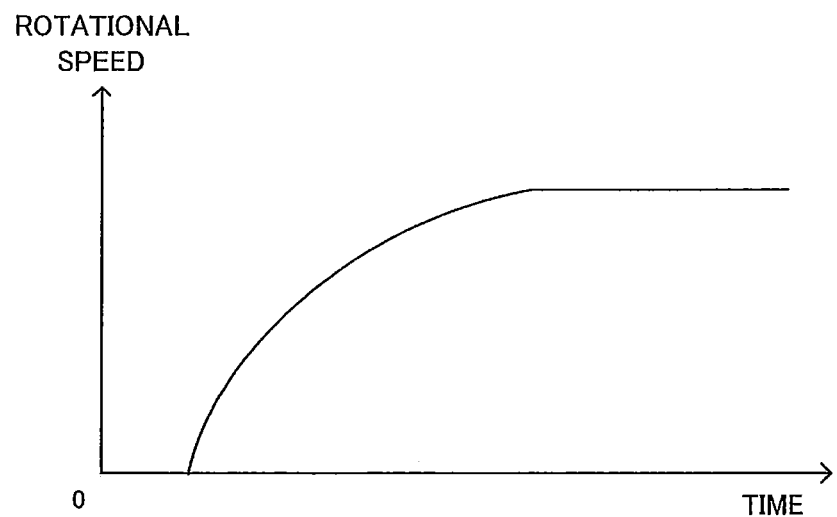
FIG. 9(c) is a timing chart illustrating changes in motor speed during start-up according to the third embodiment.
Figure 9D:
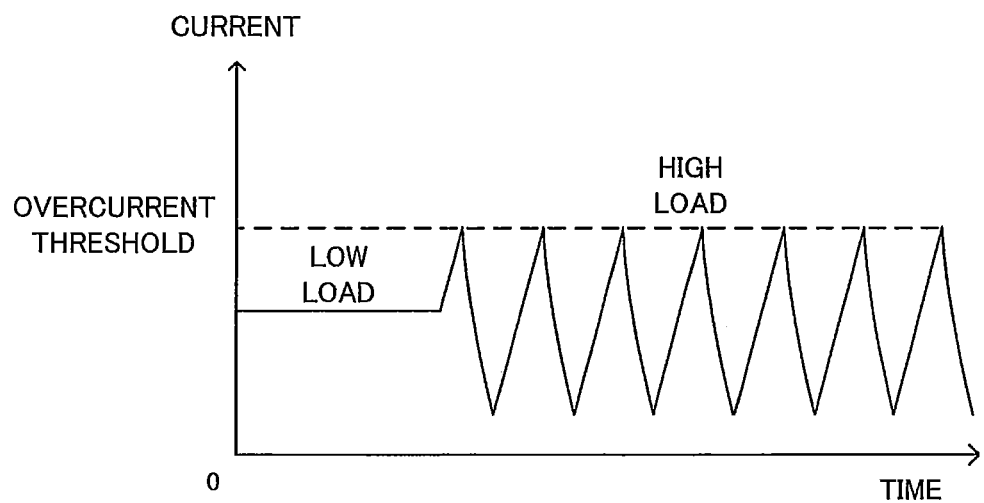
FIG. 9(d) is a timing chart illustrating changes in electrical current during a period of high load according to third embodiment.

Through this control operation, the magnitude of current varies as shown in FIG. 9(b) while the rotational speed of the AC motor 31 varies as shown in FIG. 9(c) when starting up the inverter device 1. During a period of high load, the magnitude of current varies as shown in FIG. 9(d).

As described above, the inverter device 1 according to the preferred embodiment forcibly halts the inverter circuit 16 regardless of the control unit 19 when the current flowing in the inverter device 1 is greater than an overcurrent threshold. Accordingly, this method can reliably prevent a malfunction in the inverter circuit 16, and particularly in the FETs 161 and 164. At the same time, the method can reliably prevent an overcurrent from flowing in the battery pack 2, which current can reduce the life of the battery pack 2.

Since the inverter device 1 of the preferred embodiment also suspends the forcible stoppage of the inverter circuit 16 before the AC motor 31 stops rotating due to the halted inverter circuit 16, the inverter device 1 can implement a soft start while simultaneously preventing an overcurrent during startup.

By suppressing the amount of current flowing in the AC motor 31 at startup, the power tool system can reduce the amount of load applied to the battery pack 2 and inverter device 1 at startup. Hence, even when using a portable battery pack having a low discharge capacity in order to be small and compact in the power tool system of the preferred embodiment, the battery pack can be used to start power tools that tend to produce a large continuous current at startup, including power tools that rotate large diameter blades, such as circular saws, grass trimmers, and lawn mowers, and power tools such as a hedge trimmer that have a plurality of blades sliding against one another.

While the inverter device 1 is configured to output the first and second PWM signals for halting output to the AC motor 31 in the preferred embodiment described above, the inverter device 1 may be configured to output only one of the PWM signals for halting output to the AC motor 31.

In the preferred embodiment described above, the inverter device 1 repeats operations to shut down and restart (cancel the forcible shut-down state of) the inverter circuit 16 when the current flowing in the inverter device 1 is greater than an overcurrent threshold. However, this type of control process is a waste of power during a state of high load since the possibility of eliminating overcurrent is low. Therefore, it is preferable to skip the operation for restarting the inverter circuit 16 when the current flowing in the inverter device 1 remains higher than the overcurrent threshold a prescribed time after initially shutting down the inverter circuit 16.

In this case, the cathodes of the diodes 204a and 204b can be connected to the control unit 19, for example. When the current flowing in the inverter device 1 is greater than the overcurrent threshold (the FET 204c is turned on), low level signal (0V) is inputted into the control unit 19. The control unit 19 can recognize that the inverter circuit 16 is forcibly halted when the low level signal is inputted.

Further, the inverter device 1 may be configured to store the number of times that the restarting operation was skipped and may display the history of the skipped restarting operations for the user. Further, when the number of skipped starting operations exceeds a prescribed value, the inverter device 1 may notify the user that the battery pack 2 has reached the end of its service life.

In the third embodiment described above, the inverter circuit shut-off unit 20 forcibly shuts down the inverter circuit 16 regardless of the control unit 19, but the inverter circuit shut-off unit 20 may forcibly shut down the inverter circuit 16 by shutting off the FETs 162 and 164 based on current detected through the current detection resistor 17. Alternatively, the inverter circuit shut-off unit 20 may shut off all FETs at this time.

Further, the battery pack 2 that is connected to the inverter device 1 in the preferred embodiment described above is a 14.4-V lithium battery pack, but the inverter device 1 may be configured to be connectable to different types of battery packs in addition to those housing lithium batteries, such as battery packs configured of nickel cadmium batteries or nickel metal hydride batteries, or may be configured to be connectable to a plurality of battery packs with various battery voltages.

Further, the steps for controlling the boosted voltage in S301-S304, for detecting over-discharge in S305-S306, and for detecting an overcurrent in S307 in the flowchart of FIG. 10 may be performed at any position in the flowchart or may be performed in parallel.

Next, an inverter device 1 according to a fourth embodiment of the present invention will be described with reference to FIGS. 11 through 13.

Figure 11:
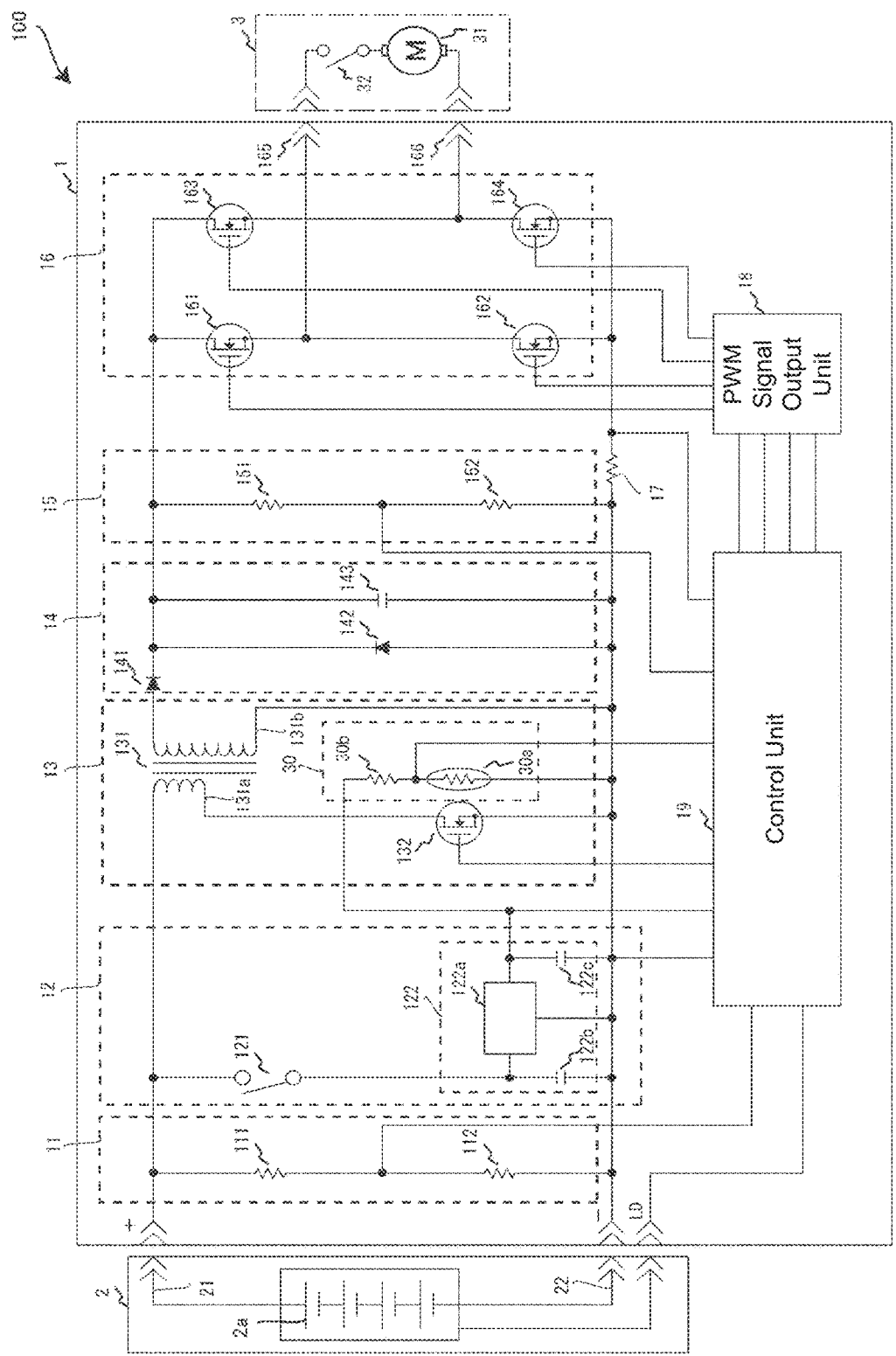
FIG. 11 is a circuit diagram for an inverter device according to a fourth embodiment of the present invention.

FIG. 11 is a circuit diagram for the inverter device 1 according to the fourth embodiment. The circuit diagram in FIG. 11 has the same configuration as that in FIG. 5, except for the addition of a temperature detection unit 30.

The temperature detection unit 30 includes a thermistor 30a disposed adjacent to the FET 132, and a resistor 30b connected in series with the thermistor 30a. The thermistor 30a and resistor 30b divide the prescribed voltage outputted from the three-terminal regulator 122a, and the temperature detection unit 30 outputs the divided voltage to the control unit 19 as a temperature signal.

Since an FET is easily damaged by an overcurrent, one measure for protecting FETs is to shut off the FET 132 when the current flowing in the current detection resistor 17 exceeds a prescribed overcurrent threshold. However, even if the detected current does not exceed the overcurrent threshold, there is still a possibility for the FETs to be damaged if the current remains above a prescribed level for an extended period of time. In addition, even if the current flowing to the FETs is too small to cause damage, the FETs can still be damaged by heat.

Therefore, the inverter device 1 according to the fourth embodiment prevents the FET 132 from being turned on/off when the current detected with the current detection resistor 17 is too high and when the temperature detected by the temperature detection unit 30 is too high.

FIG. 12 is a table showing criteria according to the preferred embodiment for determining whether to prevent the FET 132 from being turned on/off. As shown in FIG. 12, the overcurrent threshold is set to 10 A in the preferred embodiment. If a current of 10 A or greater flows in the inverter device 1 for 0.5 seconds or more, the inverter device 1 prevents the FET 132 from being turned on/off (i.e., turns off the FET 132). The inverter device 1 also prevents the FET 132 from being turned on/off even when the current flowing in the inverter device 1 is smaller than the overcurrent threshold of 10 A, such as when a current of at least 8 A and less than 10 A flows in the inverter device 1 for at least 1.0 seconds, when a current of at least 6 A and less than 8 A flows in the inverter device 1 for at least 3.0 seconds, and when a current of at least 5 A and less than 6 A flows in the inverter device 1 for at least 5.0 seconds. In other words, the inverter device 1 modifies the length of period that the FET 132 is turned on/off based on the value of current flowing in the inverter device 1, shortening the period during which the FET 132 is turned on/off as the current increases.

The inverter device 1 also prevents the FET 132 from being turned on/off even when the current flowing through the inverter device 1 is less than 5 A but at least 4 A when the temperature of the FET 132 remains within the range 100-120 degree for at least 5.0 seconds, when the temperature of the FET 132 remains within the range 80-100 degree for at least 10.0 seconds, and when the temperature of the FET 132 remains within the range 60-80 degree for at least 20.0 seconds. This configuration can suitably prevent malfunctioning of the FET 132. In this way, the inverter device 1 varies the length of period that the FET 132 is turned on/off based on the temperature of the FET 132 when the current flowing in the inverter device 1 is smaller and reduces the period during which the FET 132 is turned on/off as the temperature increases.

Since it is highly unlikely that the temperature of the FET 132 will rise drastically when the current value is less than 4 A, the inverter device 1 periodically turns the FET 132 on and off according to normal operations in this case. The inverter device 1 also turns the FET 132 on and off periodically according to normal operations when the current value is greater than or equal to 4 A but less than 5 A, provided that the temperature of the FET 132 is lower than 60 degree, since it is also unlikely that the FET 132 will be damaged in this case.

Next, the control process performed by the control unit 19 according to the fourth embodiment for halting output to the AC motor 31 will be described with reference to the flowchart in FIG. 13.

Figure 13:
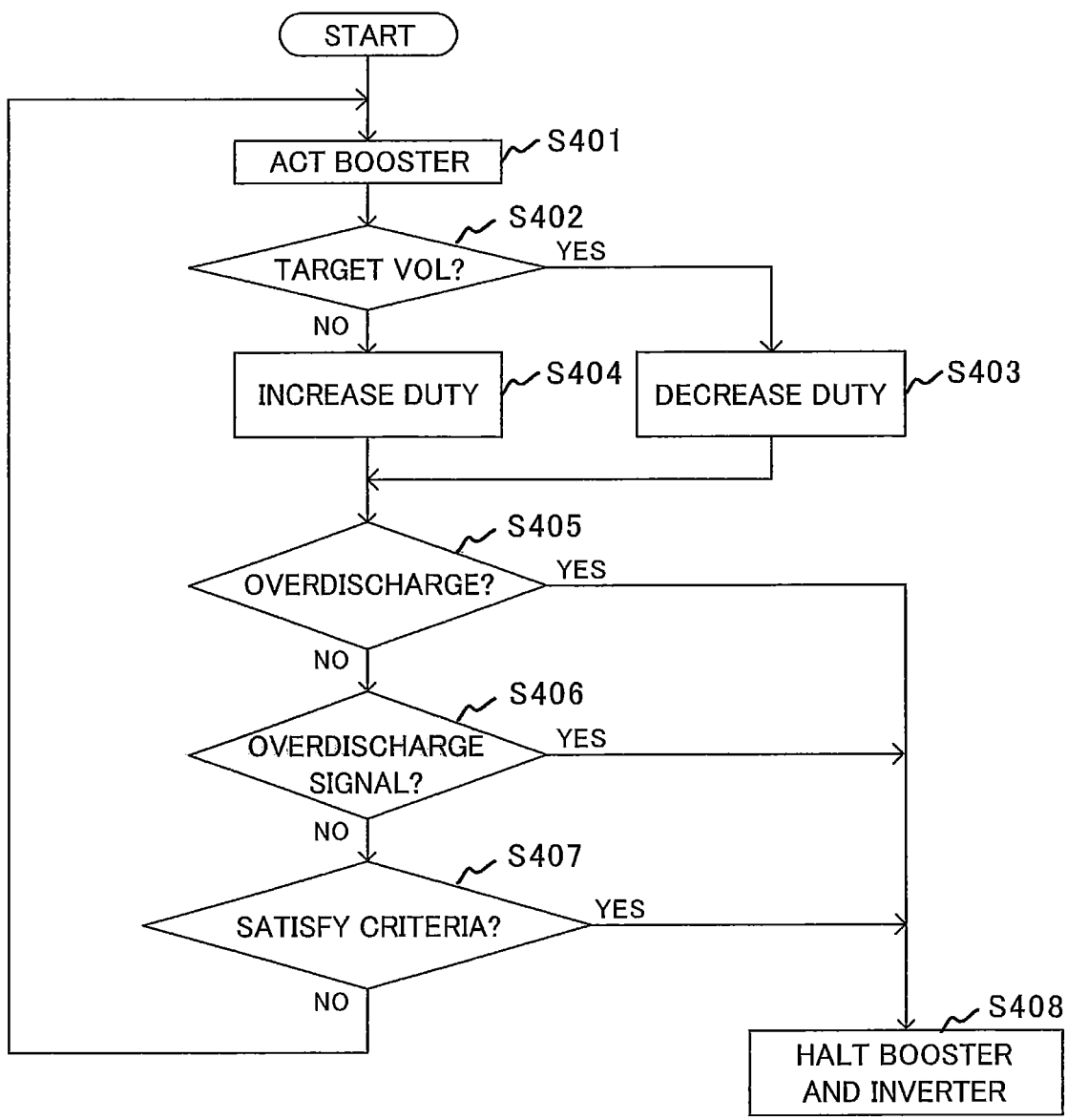
FIG. 13 is a flowchart illustrating steps in a process to halt output from the inverter device according to the fourth embodiment.

The control unit 19 begins the process in FIG. 13 either when the power switch 121 is turned on while the battery pack 2 is mounted on the inverter device 1 or when the battery pack 2 is mounted on the inverter device 1 while the power switch 121 is in an ON state. When the power switch 121 is turned on, the constant-voltage circuit 122 generates a drive voltage for driving the control unit 19 from the battery voltage of the battery pack 2.

In S401 of the flowchart in FIG. 13, the control unit 19 outputs the first PWM signal to the gate of the FET 132 in order that the AC voltage outputted from the secondary side of the transformer 131 has the desired effective voltage (141 V, for example). In S402 the control unit 19 determines whether the effective voltage boosted by the transformer 131 is greater than the target voltage based on the voltage detected by the boost voltage detection unit 15.

If the boosted voltage is greater than the target voltage (S402: YES), in S403 the control unit 19 reduces the duty cycle of the FET 132. When the boosted voltage is less than or equal to the target voltage (S402: NO), in S404 the control unit 19 increases the duty cycle of the FET 132.

In S405 the control unit 19 determines whether the battery voltage of the battery pack 2 is less than a prescribed over-discharge voltage based on the voltage detected by the battery voltage detection unit 11. If the battery voltage is less than the prescribed over-discharge voltage (S405: YES), then the control unit 19 determines that the battery pack 2 is in an over-discharge state. Accordingly, in S408 the control unit 19 outputs first and second PWM signals for halting output to the AC motor 31. Specifically, the control unit 19 halts output of the first and second PWM signals. As a result, operations of the booster circuit 13 and inverter circuit 16 are shut down, thereby halting output from the inverter device 1 to the AC motor 31.

However, if the battery voltage of the battery pack 2 is greater than or equal to the prescribed over-discharge voltage (S405: NO), in S406 the control unit 19 determines whether an over-discharge signal was inputted from the battery pack 2 via the LD terminal. If an over-discharge signal was inputted (S406: YES), then the control unit 19 determines that the battery pack 2 is in an over-discharge state. Accordingly, in S408 the control unit 19 outputs the first and second PWM signals for halting output to the AC motor 31. Specifically, the control unit 19 halts output of the first and second PWM signals.

If an over-discharge signal was not inputted (S406: NO), in S407 the control unit 19 determines whether the current detected by the current detection resistor 17 and the temperature detected by the temperature detection unit 30 satisfy the determination criteria shown in FIG. 12. When the determination criteria is met (S407: YES), in S408 the control unit 19 turns off the FET 132. Specifically, the control unit 19 outputs a first PWM signal for preventing the FET 132 from turning on.

However, if the determination criteria is not met (S407: NO), the control unit 19 returns to S401.

As described above, the inverter device 1 according to the fourth embodiment shuts off the FET 132 (i.e., prevents the FET 132 from turning on/off) based on both the current detected by the current detection resistor 17 and the temperature detected by the temperature detection unit 30. Therefore, the inverter device 1 can suitably prevent the FET 132 from malfunctioning when the power tool 3 has a high load.

As shown in FIG. 12, the inverter device 1 varies an ON/OFF signal duration (allowable duration) before the FET 132 is prevented from turning on/off based on both the current detected by the current detection resistor 17 and the temperature detected by the temperature detection unit 30. Accordingly, the inverter device 1 can suitably prevent the FET 132 from malfunctioning when the power tool 3 has a high load.

As indicated in FIG. 12, when the current detected by the current detection resistor 17 exceeds 5 A, the inverter device 1 determines whether to turn off the FET 132 without regard for the temperature detected by the temperature detection unit 30. Accordingly, the inverter device 1 can suitably prevent the FET 132 from malfunctioning when the power tool 3 has a high load.

While the inverter device 1 is configured to output the first and second PWM signals for halting output to the AC motor 31 in the preferred embodiment described above, the inverter device 1 may be configured to output only one of the PWM signals for halting output to the AC motor 31.

While the thermistor 30a is disposed adjacent to the FET 132 in the preferred embodiment described above, the thermistor 30a may be disposed adjacent to the FETs 161-164 instead. In this case, the inverter device 1 may shut off the FETs 161-164 using the second PWM signal based on both the current detected by the current detection resistor 17 and the temperature detected by the temperature detection unit 30.

Further, the battery pack 2 that is connected to the inverter device 1 in the preferred embodiment described above is a 14.4-V lithium battery pack, but the inverter device 1 may be configured to be connectable to different types of battery packs in addition to those housing lithium batteries, such as battery packs configured of nickel cadmium batteries or nickel metal hydride batteries, or may be configured to be connectable to a plurality of battery packs with various battery voltages.

Further, the processes for controlling the boosted voltage in S401-S404, for detecting over-discharge in S405-S406, and for controlling the halting of output in S407 described in the flowchart of FIG. 13 may be performed at any position in the flowchart or may be performed in parallel.

The inverter device 1 may also store a count value indicating the number of times that output to the AC motor 31 was halted, and may display this history of halted output. In addition, the inverter device 1 may be configured to notify the user that the battery pack 2 has reached the end of its service life when output to the AC motor 31 has been halted more than a prescribed number of times.

Next, an inverter device 1 according to a fifth embodiment of the present invention will be described with reference to FIGS. 14 and 15.

Figure 14:
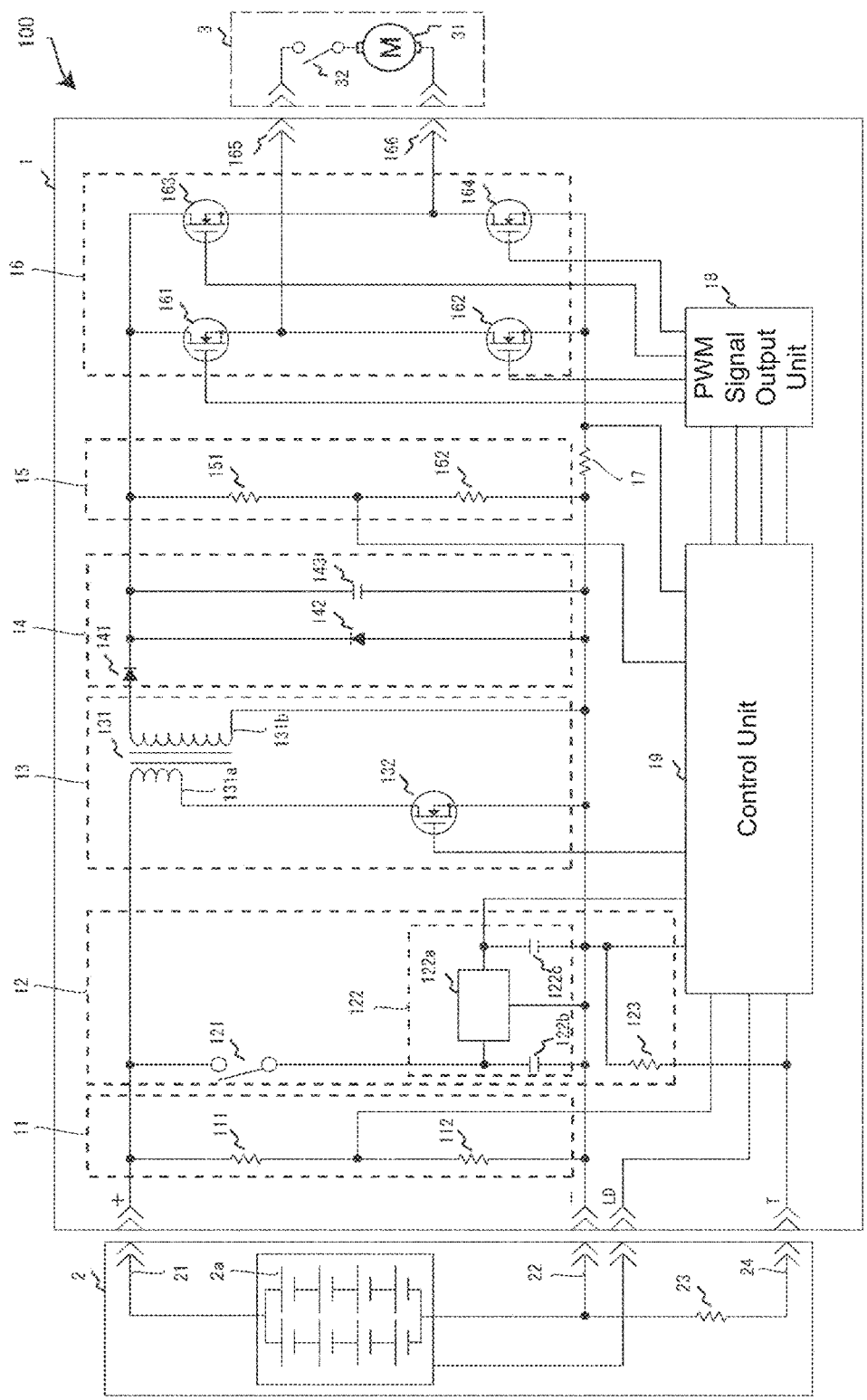
FIG. 14 is a circuit diagram of an inverter device according to a fifth embodiment of the present invention.

FIG. 14 is a circuit diagram for the inverter device 1 according to the fifth embodiment. The circuit diagram in FIG. 14 has the same configuration as that in FIG. 5, except for the structures of the battery pack 2 and power supply unit 12.

In the fifth embodiment, the battery pack 2 further includes a first battery characteristic determining resistor 23 having a resistance value that corresponds to the characteristics of the battery pack 2, and a battery characteristic outputting terminal 24. Battery packs 2 having differing characteristics can be mounted on the inverter device 1. In the present embodiment, the battery characteristics includes the number of parallel of battery cells 2a, the rated voltage, and the type of the battery cells 2a, although not limited to these examples.

In addition to the power switch 121 and constant-voltage circuit 122, the power supply unit 12 in the fifth embodiment includes a second battery characteristic determining resistor 123. The second battery characteristic determining resistor 123 is connected between the three-terminal regulator 122a and the minus terminal 22 of the battery pack 2 and the minus terminal 22 via the battery characteristic outputting terminal 24. The second battery characteristic determining resistor 123 and the first battery characteristic determining resistor 23 divide a prescribed voltage outputted from the three-terminal regulator 122a (5 V in the preferred embodiment), and output this divided voltage to the control unit 19. Since the resistance value of the first battery characteristic determining resistor 23 differs according to the characteristics of the battery pack 2, the control unit 19 can determine the characteristics of the battery pack 2 based on the divided voltage inputted from the power supply unit 12 and can output an identification signal that identifies these characteristics (the battery type).

While battery packs 2 having differing characteristics can be connected to the inverter device 1 in the preferred embodiment, there is a danger that the life and outputting efficiency of the battery pack 2 could be drastically degraded by attempting to draw the same amount of power from all battery packs 2. For example, when attempting to draw the same current from a battery pack 2 having battery cells connected in a single series as from a battery pack 2 having cells connected in two parallel series, the current flowing in the former will be twice that flowing in the latter, potentially reducing the service life of the battery pack 2 configured of a single series of battery cells. Further, since the rated current of the battery pack 2 differs according to its type, the service life of the battery pack 2 could be reduced for the same reason.

Normally, the ratio of turns on the secondary winding to the turns on the primary winding of a transformer is set to a value for obtaining maximum conversion efficiency when a prescribed voltage is applied. Hence, when a battery pack 2 having a rated voltage different from this prescribed voltage is connected to the inverter device 1, the conversion efficiency of the transformer 131 may drop drastically. This drop in efficiency may lead to a rise in temperature in the inverter device 1, requiring a cooling fan or the like and, therefore, increasing the size of the inverter device 1.

Accordingly, the inverter device 1 according to the preferred embodiment controls voltage outputted from the inverter device 1 to the AC motor 31 based on a battery characteristic identification signal obtained from the battery characteristic outputting terminal 24 (first battery characteristic determining resistor 23). Specifically, the inverter device 1 outputs first and second PWM signals to prevent the FET 132 and FETs 161-164 from being turned on/off.

Next, the control process performed by the control unit 19 according to the fifth embodiment for halting output to the AC motor 31 will be described with reference to the flowchart in FIG. 15.

Figure 15:
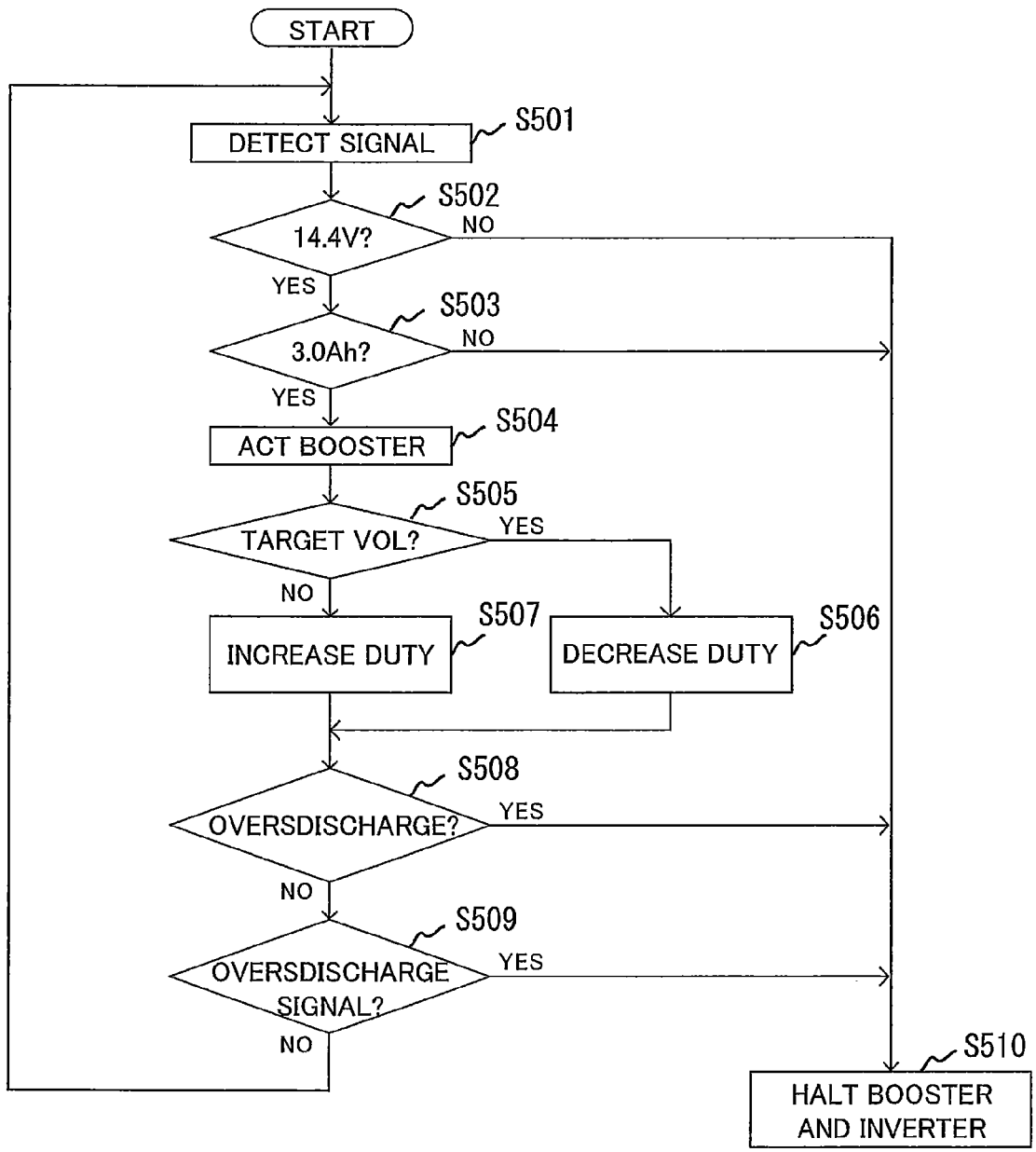
FIG. 15 is a flowchart illustrating steps in a process for preventing output from the inverter device according to the fifth embodiment.

The control unit 19 begins the process in FIG. 15 either when the power switch 121 is turned on while the battery pack 2 is mounted on the inverter device 1 or when the battery pack 2 is mounted on the inverter device 1 while the power switch 121 is in an ON state. When the power switch 121 is turned on, the constant-voltage circuit 122 generates a drive voltage for driving the control unit 19 from the battery voltage of the battery pack 2.

The inverter device 1 according to the preferred embodiment has a configuration suited for supplying power from a battery pack 2 having a rated voltage of 14.4 V and a rated capacity of 3.0 Ah (two series of cells connected in parallel).

In S501 of the flowchart in FIG. 15, the control unit 19 detects the battery characteristic identification signal received from the first battery characteristic determining resistor 23 and second battery characteristic determining resistor 123. In S502 the control unit 19 determines whether the rated voltage of the battery pack 2 connected to the inverter device 1 is 14.4 V based on the battery characteristic identification signal.

If the battery pack 2 is not 14.4 V but, for example, is an 18-V battery pack (S502: NO), in S510 the control unit 19 outputs the first and second PWM signals for preventing power from being outputted from the inverter device 1 to the AC motor 31. Specifically, the control unit 19 halts output of the first and second PWM signals, thereby halting operations of the booster circuit 13 and inverter circuit 16 and interrupting output from the inverter device 1 to the AC motor 31.

As described above, the transformer 131 is set to have optimum power efficiency when the battery pack 2 connected to the inverter device 1 has a rated voltage of 14.4 V. Since output efficiency is reduced if an 18.0-V battery pack is connected, it may not be possible to obtain the desired output. Therefore, this operation serves to interrupt output to the AC motor 31 in such a case.

However, when the connected battery pack 2 has a rated voltage of 14.4 V (S502: YES), in S503 the control unit 19 determines whether the battery pack 2 has a rated capacity of 3.0 Ah based on the battery characteristic identification signal.

If the battery pack 2 does not have a 3.0-Ah rated capacity (S503: NO), in S510 the control unit 19 outputs the first and second PWM signals for preventing power from being outputted from the inverter device 1 to the AC motor 31. Specifically, the control unit 19 halts output of the first and second PWM signals.

As described above, the inverter device 1 is configured to achieve optimal use with battery packs having a rated capacity of 3.0 Ah (battery cells connected in two parallel series). When the connected battery pack has a rated capacity of 1.5 Ah (is configured of a single series of cells), an electric current twice the magnitude of that flowing in a battery pack with two parallel series of cells will be produced when attempting to draw the same power as when the connected battery pack has a rated capacity of 3.0 Ah. This large current can shorten the life of the battery pack and potentially damage the FET 132.

However, when the battery pack 2 connected to the inverter device 1 has a rated capacity of 3.0 Ah (S503: YES), the control unit 19 begins outputting power to the AC motor 31 since the connected battery pack 2 is suited for the inverter device 1 of the preferred embodiment.

Specifically, in S504 the control unit 19 outputs the first PWM signal to the gate of the FET 132 in order that the AC power outputted from the secondary side of the transformer 131 has the desired effective voltage (141 V, for example). In S505 the control unit 19 determines whether the effective voltage boosted by the transformer 131 is greater than the target voltage based on the voltage detected by the boost voltage detection unit 15.

If the boosted voltage is greater than the target voltage (S505: YES), in S506 the control unit 19 reduces the duty cycle of the FET 132. When the boosted voltage is less than or equal to the target voltage (S505: NO), in S507 the control unit 19 increases the duty cycle of the FET 132.

In S508 the control unit 19 determines whether the battery voltage of the battery pack 2 is less than a prescribed over-discharge voltage based on the voltage detected by the battery voltage detection unit 11. If the battery voltage is less than the prescribed over-discharge voltage (S508: YES), then the control unit 19 determines that the battery pack 2 is in an over-discharge state. Accordingly, in S510 the control unit 19 outputs first and second PWM signals for halting output to the AC motor 31. Specifically, the control unit 19 halts output of the first and second PWM signals. As a result, operations of the booster circuit 13 and inverter circuit 16 are shut down, thereby halting output from the inverter device 1 to the AC motor 31.

However, if the battery voltage of the battery pack 2 is greater than or equal to the prescribed over-discharge voltage (S508: NO), in S509 the control unit 19 determines whether an over-discharge signal was inputted from the battery pack 2 via the LD terminal. If an over-discharge signal was inputted (S509: YES), then the control unit 19 determines that the battery pack 2 is in an over-discharge state. Accordingly, in S510 the control unit 19 outputs the first and second PWM signals for halting output to the AC motor 31. Specifically, the control unit 19 halts output of the first and second PWM signals.

However, if an over-discharge signal was not inputted (S510: NO), the control unit 19 returns to S501.

As described above, the inverter device 1 according to the preferred embodiment halts operations of the booster circuit 13 and inverter circuit 16 according to the battery characteristic identification signal obtained from the first battery characteristic determining resistor 23. Therefore, the inverter device 1 can prevent a drastic reduction in the service life and output efficiency of the battery pack 2 when a battery pack 2 not suitable for the inverter device 1 is connected thereto.

For example, when a battery pack 2 configured of a single series of cells is connected to the inverter device 1, the structure of the inverter device 1 described above can avoid reducing the service life of the battery pack 2.

The configuration of the inverter device 1 described above can also avoid reducing the service life of a battery pack 2 that is different from the prescribed type when such a battery pack 2 is connected to the inverter device 1.

The inverter device 1 having the above configuration can also prevent a drop in conversion efficiency of the transformer 131 when the battery pack 2 connected to the inverter device 1 does not have the prescribed rated voltage (18 V, for example).

In the preferred embodiment described above, the inverter device 1 prevents the FET 132 and FETs 161 and 164 from being turned on/off according to the battery characteristic identification signal obtained from the first battery characteristic determining resistor 23. However, the inverter device 1 may be configured to prevent only one of the FET 132 and the FETs 161-164 from being turned on/off instead.

The inverter device 1 according to the preferred embodiment determines the type of battery pack 2 connected to the inverter device 1 using the first battery characteristic determining resistor 23 disposed in the battery pack 2 and the second battery characteristic determining resistor 123 disposed in the inverter device 1. However, the inverter device 1 is not limited to this method of determination, provided that the inverter device 1 can distinguish between battery packs that the inverter device 1 supports and does not support.

For example, the inverter device 1 may be configured to determine battery packs that are supported by the inverter device 1 based on the presence of an identification terminal connecting the battery pack to the inverter device 1, where battery packs possessing a terminal other than a charging/discharging terminal (an identification terminal) are supported, while those not possessing an identification terminal are not supported. Alternatively, the connectors of batteries and inverter devices (parts for connecting the inverter devices to battery packs) may be shaped differently according to type so that battery packs that are mechanically unusable cannot be mounted on (connected to) the inverter device.

Further, the battery pack 2 that is connected to the inverter device 1 in the preferred embodiment described above is a 14.4-V lithium battery pack, but the inverter device 1 may be configured to prevent output according to different types of battery packs in addition to those housing lithium batteries, such as battery packs configured of nickel cadmium batteries or nickel metal hydride batteries, or may be configured to support battery packs with different voltages (18 V, for example).

Further, the processes for controlling the boosted voltage in S504-S507 and for detecting over-discharge in S508-S509 in the flowchart of FIG. 15 may be performed at any position in the flowchart or may be performed in parallel.

In the flowchart of FIG. 15, an overcurrent detection may be further performed. Specifically, the control unit 19 halts the operations of the booster circuit unit 13 and inverter circuit 16 when the current detected by the current detection resistor 17 has exceeded a predetermined current. With this construction, it can prevented that the battery pack 2, the AC motor 32, and FETs 132 and 161-164 are damaged due to the heat generated by the overcurrent.

While the invention has been described in detail with reference to the embodiments thereof, it would be apparent to those skilled in the art that various changes and modifications may be made therein without departing from the spirit of the invention.

For example, the processes described in the first through fifth embodiments may also be used in combination. For example, the reliability of the inverter device 1 may be further improved by combining the soft start described in either the first or third embodiment with one or all of the control processes for halting output in the second, fourth, and fifth embodiments.

The invention claimed is:

1. A power tool system comprising:
   a power tool including an AC motor being controlled by AC power signal, and a trigger switch;
   a portable battery pack; and
   a power supply device including an inverter circuit that converts a DC power supplied from the portable battery pack into an AC power to supply the AC power to the AC motor, and a control circuitry that controls the inverter circuit to start converting the DC power when the trigger switch is turned on,
   wherein the control circuitry controls to start supplying to the AC motor a first AC power smaller than a target power when the trigger switch is turned on,
   wherein the control circuitry restricts the AC power supplied to the AC motor so that the AC power does not reach the target power until a predetermined time has elapsed since the trigger switch is turned on, and
   wherein the control circuitry controls the inverter circuit to increase the AC power supplied to the AC motor from the first AC power to the target power during the predetermined time, in spite of an amount of operation of the trigger switch while the trigger switch continues being turned on.

2. The power tool system according to claim 1, wherein the control circuitry restricts the AC power supplied to the AC motor immediately after the trigger switch is operated.

3. The power tool system according to claim 1, wherein the control circuitry controls the inverter circuit to increase the AC power supplied to the AC motor from the first AC power to the target power in steps until the predetermined time has elapsed since the trigger switch is operated.

4. The power tool system according to claim 1, wherein the power supply device further includes:
   a first switching element that turns on and off to convert the DC power supplied from the portable batter pack into an AC power; and
   a rectifying and smoothing circuit that converts the AC power converted by the first switching element into a DC power,
   wherein the inverter circuit converts the DC power outputted from the rectifying/smoothing circuit into the AC power supplied to the AC motor, and
   wherein the control circuitry controls the inverter circuit to increase the AC power supplied to the AC motor from the first AC power to the target power in steps by changing a switching duty of the first switching element.

5. The power tool system according to claim 1, wherein the inverter circuit further includes a plurality of second switching elements that turns on and off to convert the DC power supplied from the portable battery pack into the AC power supplied to the AC motor, and
   wherein the control circuitry controls the inverter circuit to increase the AC power supplied to the AC motor from the first AC power to the target power in steps by changing a switching duty of the plurality of second switching elements.

6. The power tool system according to claim 1, wherein the control circuitry prevents the AC power from being supplied to the AC motor when a battery voltage of the battery pack is smaller than a predetermined voltage.

7. The power tool system according to claim 1, wherein the battery pack transmits an overdischage signal to the control circuitry when determining that an overdischarge occurs in the battery pack, and
   wherein the control circuitry prevents the AC power from being supplied to the AC motor when receiving the over-discharge signal from the battery pack.

8. The power tool system according to claim 1, wherein the power supply device further includes a halting circuitry that forcibly halts the inverter circuit regardless of the control circuitry when a current flowing in the inverter circuit exceeds a predetermined current.

9. The power tool system according to claim 8, wherein the power supply device further includes a recovery circuitry that suspends the forcible halt of the inverter circuit when the current falls below the predetermined current after a first predetermined time has elapsed since the halting circuitry forcibly has halted the inverter circuit.

10. The power tool system according to claim 9, wherein the power supply device further includes a preventing circuitry that prevents the recovery circuitry from suspending the forcible halt of the inverter circuit when the current exceeds the predetermined current again after a second predetermined time longer than the first predetermined time has elapsed since the current has firstly exceeded the predetermined current.

11. The power tool system according to claim 8, wherein the halting circuitry operates at least when the AC motor is started up.

12. The power tool system according to claim 1, wherein the AC motor is capable of being operated by an AC power supplied to the power tool system from outside thereof.

13. A power supply device connectable to a power tool including an AC motor being controlled by AC power signals, and a trigger switch, comprising:
   an inverter circuit that converts a DC power supplied from a portable battery pack into an AC power to supply the AC power to the AC motor; and
   a control circuitry that controls the inverter circuit to start converting the DC power supplied from the portable battery pack into the AC power when the trigger switch is turned on,
   wherein the control circuitry restricts the AC power supplied to the AC motor so that the AC power does not reach the target power until a predetermined time has elapsed since the trigger switch is turned on, and
   wherein the control circuitry controls the inverter circuit to increase the AC power supplied to the AC motor from the first AC power to the target power during the predetermined time, in spite of an amount of operation of the trigger switch while the trigger switch continues being turned on.

14. The power supply device according to claim 13, wherein the control circuitry restricts the AC power supplied to the AC motor immediately after the trigger switch is turned on.

15. The power supply device according to claim 13, wherein the AC motor is capable of being operated by an AC power supplied to the power tool system from outside thereof.

16. The power supply device according to claim 13, wherein the control circuitry controls the inverter circuit to increase the AC power supplied to the AC motor from the first AC power to the target power in steps until the predetermined time has elapsed since the trigger switch is operated.

17. The power supply device according to claim 13, wherein the power supply device further includes:
   a first switching element that turns on and off to convert the DC power supplied from the portable batter pack into an AC power; and
   a rectifying and smoothing circuit that converts the AC power converted by the first switching element into a DC power,
   wherein the inverter circuit converts the DC power outputted from the rectifying and smoothing circuit into the AC power supplied to the AC motor, and
   wherein the control circuitry controls the inverter circuit to increase the AC power supplied to the AC motor from the first AC power to the target power in steps by changing a switching duty of the first switching element.

18. The power supply device according to claim 13, wherein the inverter circuit further includes a plurality of second switching elements that turns on and off to convert the DC power supplied from the portable battery pack into the AC motor, and
   wherein the control circuitry controls the inverter circuit to increase the AC supplied to the AC motor from the first AC power to the target power in steps by changing a switching duty of the plurality of second switching elements.

19. The power supply device according to claim 13, wherein the control circuitry prevents the AC power from being supplied to the AC motor when a battery voltage of the battery pack is smaller than a predetermined voltage.

20. The power supply device according to claim 13, wherein the battery pack transmits an overdischarge signal to the control circuitry when determining that an overdischarge occurs in the battery pack, and
   wherein the control circuitry prevents the AC power from being supplied to the AC motor when receiving the overdischarge signal from the battery pack.

21. The power supply device according to claim 13, further comprising a halting circuitry that forcibly halts the inverter circuit regardless of the control circuitry when a current flowing in the inverter circuit exceeds a predetermined current.

22. The power supply device according to claim 21, further comprising a recovery circuitry that suspends the forcible halt of the inverter circuit when the current falls below the predetermined current after a first predetermined time has elapsed since the halting circuitry forcibly has halted the inverter circuit.

23. The power supply device according to claim 22, further comprising a preventing circuitry that prevents the recovery circuitry from suspending the forcible halt of the inverter circuit when the current exceeds the predetermined current again after a second predetermined time longer than the first predetermined time has elapsed since the current has firstly exceeded the predetermined current.

24. The power supply device according to claim 21, wherein the halting circuitry operates at least when the AC motor is started up.

* * * * *